(12) United States Patent
Goodman

(10) Patent No.: US 12,146,405 B2
(45) Date of Patent: Nov. 19, 2024

(54) WELL INTEGRITY SAFETY FACTOR FOR EVALUATING THREADED CONNECTIONS DURING WELL OPERATIONS

(71) Applicant: eWellbore, LLC, Houston, TX (US)

(72) Inventor: Malcolm A. Goodman, Houston, TX (US)

(73) Assignee: eWellbore, LLC, Houston, TX (US)

( * ) Notice: Subject to any disclaimer, the term of this patent is extended or adjusted under 35 U.S.C. 154(b) by 0 days.

(21) Appl. No.: 18/389,327

(22) Filed: Nov. 14, 2023

(65) Prior Publication Data

US 2024/0151136 A1 May 9, 2024

Related U.S. Application Data

(63) Continuation-in-part of application No. 17/973,429, filed on Oct. 25, 2022, now Pat. No. 11,873,683, which is a continuation-in-part of application No. 17/452,064, filed on Oct. 23, 2021, now Pat. No. 11,513,027, which is a continuation-in-part of application No. 16/413,331, filed on May 15, 2019, now Pat. No. 11,156,526.

(60) Provisional application No. 63/444,501, filed on Feb. 9, 2023, provisional application No. 62/671,771, filed on May 15, 2018.

(51) Int. Cl.
*E21B 47/117* (2012.01)
*G01M 3/28* (2006.01)

(52) U.S. Cl.
CPC ......... *E21B 47/117* (2020.05); *G01M 3/2815* (2013.01); *E21B 2200/20* (2020.05)

(58) Field of Classification Search
CPC . E21B 47/117; E21B 2200/20; G01M 3/2815
See application file for complete search history.

(56) References Cited

U.S. PATENT DOCUMENTS

| | | | |
|---|---|---|---|
| 5,788,401 A * | 8/1998 | Drenth | E21B 17/042 |
| | | | 403/353 |
| 6,877,202 B2 * | 4/2005 | Maeda | F16L 15/004 |
| | | | 285/332 |
| 11,873,683 B2 * | 1/2024 | Goodman | E21B 47/117 |

* cited by examiner

*Primary Examiner* — David Z Huang
(74) *Attorney, Agent, or Firm* — Culhane Meadows PLLC

(57) ABSTRACT

System and methods are described for evaluating the integrity of threaded connections, as installed, under a set of current operating conditions. The integrity safety factor for a threaded connection ($ISF_{CON}$) is a function of effective pressure (Pe) and von Mises stress ($\sigma_{VM}$) and includes three constants: a leak path factor ($\delta$), a thread modulus ($\alpha$), and a makeup leak resistance ($\beta$). The method includes determining a value for each of the three constants using a set of laboratory test conditions. The method includes changing the set of current operating conditions of the well to maintain integrity if and when the calculated integrity safety factor ($ISF_{CON}$) is less than a threshold value. The method also includes a load management computer for building a computer model, detecting an anomalous integrity safety factor, generating a plurality of proposed adjustments, and selecting one or more optimal adjustments for improving the anomalous integrity safety factor.

11 Claims, 15 Drawing Sheets

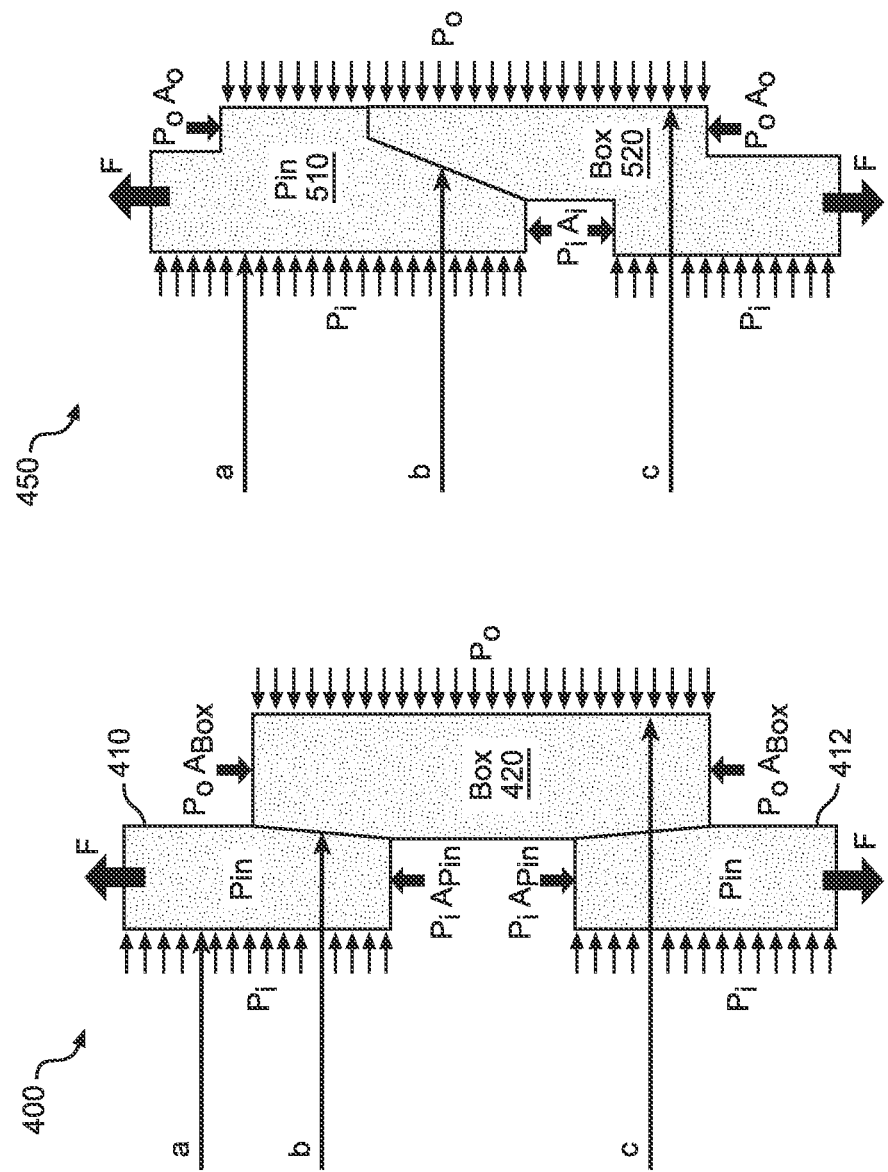

| Load Case | $P_i$ (ksi) | $P_o$ (ksi) | Leak F (kips) | $\Delta p$ (ksi) | $\sigma_r$ (ksi) | $\sigma_\theta$ (ksi) | $\sigma_z$ (ksi) | $\tau$ (ksi) | $\sigma_{VM}$ (ksi) | $P$ (ksi) | $\sigma_n$ (ksi) | $P\text{-}\sigma_n$ (ksi) |
|---|---|---|---|---|---|---|---|---|---|---|---|---|
| 1 | 0 | 0 | 621 | 0 | 0 | 0 | 22.412 | 4.791 | 23.899 | 7.471 | 0 | 7.471 |
| 2 | 1 | 1 | 610 | 0 | -1 | -1 | 21.428 | 4.751 | 23.890 | 6.476 | -1 | 7.476 |
| 3 | 2 | 2 | 598 | 0 | -2 | -2 | 20.408 | 4.702 | 23.843 | 5.469 | -2 | 7.469 |
| 4 | 5 | 5 | 564 | 0 | -5 | -5 | 17.421 | 4.573 | 23.779 | 2.474 | -5 | 7.474 |
| 5 | 10 | 10 | 507 | 0 | -10 | -10 | 12.431 | 4.355 | 23.665 | -2.523 | -10 | 7.477 |
| 6 | 1 | 0 | 692 | 1 | 0 | 12.299 | 24.974 | 5.383 | 23.553 | 12.424 | 6.150 | 6.275 |
| 7 | 2 | 1 | 681 | 1 | -1 | 11.299 | 23.990 | 5.343 | 23.539 | 11.430 | 5.150 | 6.280 |
| 8 | 4 | 2 | 725 | 2 | -2 | 22.599 | 24.992 | 5.771 | 27.742 | 15.197 | 10.299 | 4.897 |
| 9 | 0 | 1 | 527 | -1 | -1 | -13.300 | 18.433 | 4.066 | 28.592 | 1.378 | -7.150 | 8.527 |
| 10 | 1 | 2 | 516 | -1 | -2 | -14.300 | 17.449 | 4.026 | 28.590 | 0.383 | -8.150 | 8.533 |
| 11 | 2 | 4 | 405 | -2 | -4 | -28.599 | 12.270 | 3.213 | 36.069 | -6.776 | -16.299 | 9.523 |

Example Leaking Test Cases 700A for a 9-5/8 in 40 ppf N80 Generic Premium Connection

FIG. 9

Example FEA Leak Loads and Stresses for a 7-inch 35-ppf N80 LTC Connection

LTC Leak Envelope with 23 Data Points Superimposed on Pipe Ellipse

Comparison of Data Trendline with Criterion Based on Two Uniaxial Tests and One Capped-End Test

Workflow Chart for Safe Load Management

WELL INTEGRITY SAFETY FACTOR FOR EVALUATING THREADED CONNECTIONS DURING WELL OPERATIONS

CROSS REFERENCE TO RELATED APPLICATIONS

The present application claims the benefit of and priority to U.S. Provisional Application 63/444,501 filed Feb. 9, 2023, entitled, "Well Integrity Safety Factor." The present application is a continuation-in-part of currently U.S. application Ser. No. 17/973,429 filed Oct. 25, 2022, which was a continuation-in-part of U.S. application Ser. No. 17/452,064 filed Oct. 23, 2021 (now U.S. Pat. No. 11,513,027), which was a continuation-in-part of U.S. application Ser. No. 16/413,331 filed May 15, 2019 (now U.S. Pat. No. 11,156, 256), which claimed the benefit of and priority to U.S. Provisional Application 62,671,771 filed May 15, 2018. The entirety of each identified application is incorporated herein by reference.

TECHNICAL FIELD

Examples and methods set forth in the present disclosure relate to the evaluation and optimization of threaded connections in well tubulars during the operation of wells, such as petroleum, geothermal, and carbon-capture wells. More particularly, but not by way of limitation, the present disclosure describes calculating a well integrity safety factor for a threaded connection based on current operating conditions, actual well geometry, and three leak constants for the threaded connection, which are calculated under laboratory test conditions.

BACKGROUND

During the drilling process, a well hole segment is typically supported by a tubular pipe called a casing. The next casing inside the previous casing supports the next hole segment, and so on, until the casing reaches the total depth of the well. The innermost pipe is the production string called tubing. The term 'tubular' will be used here for all wellbore pipes, including tubing, casing, liners, and tie-backs, as well as drill pipe, bottom hole assemblies, and work strings. In most strings, all the joints and connections are the same; namely, the same pipe diameters (inner and outer), the same connection type and size, and the same yield strength. Tapered strings have two or more sections in which all the joints and connections are the same.

Most well tubulars are fabricated in cylindrical sections (typically, thirty to forty feet in length), oriented in a column, and joined together with threaded connections. The size, wall thickness, and yield strength of the tubular and its threaded connections are structurally designed to reduce the risk of failure, including pipe-body failure (burst, collapse, or axial parting) and threaded connection failure (leak, pull-out, or thread fracture).

For pipe body design, the yield strength (Y) of the pipe material (steel, typically) can be measured by placing a rod-shaped specimen of the material under axial tension until it yields. To evaluate pipe integrity, the yield point of the pipe body is typically compared to the von Mises stress ($\sigma_{VM}$), which is a scalar quantity determined from the stresses acting on the pipe body. In general, if the von Mises stress ($\sigma_{VM}$) is less than the yield strength (Y), the pipe body is safe.

For connection design, connection failure due to leak is an important part of current tubular design in the petroleum industry. The threaded connections currently available include standard connections (sometimes called API connections, referring to the standards of the American Petroleum Institute) and proprietary designs sometimes called premium connections. The mechanical behavior of a threaded connection can be estimated by using finite element analysis (FEA) or by conducting extensive testing. Current qualification testing procedures for leak assessment of a threaded connection involve numerous laboratory tests, conducted using specified axial forces (tension or compression) and specified internal and external pressures. The test procedure is repeated for a variety of different conditions, using multiple specimens of the connection. Each specimen is tested until it leaks, or until the pipe (or the connection) fails. Internal leak tests are performed with no external backup pressure. External leak tests are performed with no internal backup pressure. The total cost of such testing can exceed one million dollars—and the results apply only to the specific threaded connection tested, and only to the precise size tested. Additional FEA or laboratory testing must be conducted for other sizes of the same connection design. The test results are typically plotted on a graph to display a connection usage envelope; analogous to the von Mises ellipse, with pressure on the ordinate (internal pressure positive) and axial force on the abscissa (tension positive). If the estimated loads on a threaded connection fall within the leak envelope, the connection is safe.

For tubular design, including the design for threaded connections, the currently used design criteria do not include any consideration of hydrostatic pressure. The current failure theories and equations for both the pipe body and for connections are based on shear and ignore hydrostatic pressure.

Well design is based on an expected set of loads and well geometry before operations begin. Well integrity is based on the actual set of loads and geometry encountered during well operations. Well integrity as used herein refers to and includes the application of technical, operational, and organizational solutions to reduce the risk of uncontrolled release of formation fluids throughout the life cycle of a well. Well integrity involves all components of a well.

During well operations, the casing, connections, and other components are already installed and cannot be changed. The actual set of loads acting on the components (e.g., fluid pressures, temperatures, and axial tension/compression) can be adjusted, in some situations, by changing the operating conditions. Because tubular connections represent a primary source of leak risk, there is a need to evaluate well integrity during operations based on the relative safety of the threaded connections.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to-scale unless otherwise indicated. The dimensions of the various elements may be enlarged or reduced in the interest of clarity. The several figures depict one or more implementations and are presented by way of example only and should not be construed as limiting. Included in the drawings are the following figures:

FIG. 4 is a cross-sectional view of an example tubing or casing coupled connection having a radial interference seal;

FIG. 5 is a cross-sectional view of an example drill string connection having an axial interference shoulder seal;

FIG. 9 is a table of values associated with a plurality of example leaking test cases;

DETAILED DESCRIPTION

Figure 1:
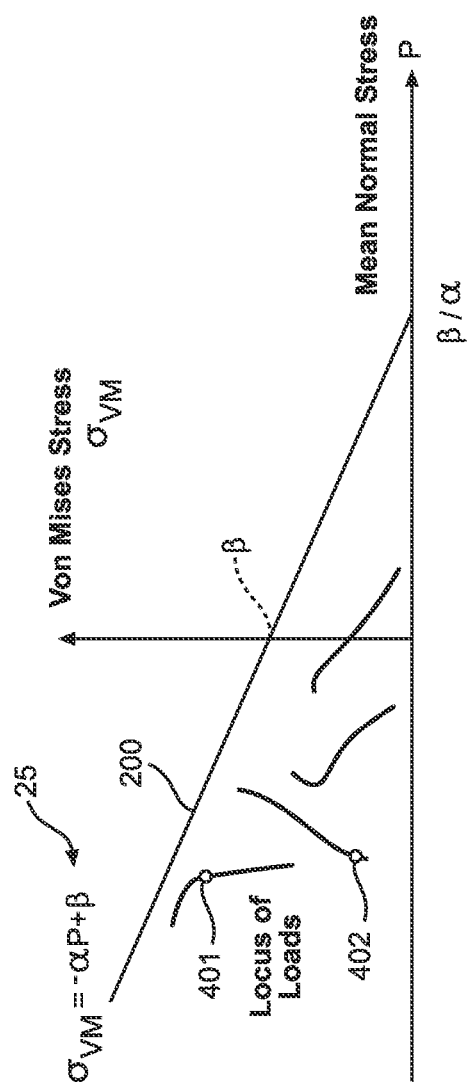
FIG. 1 is a graphical representation of a triaxial connection leak criterion, plotted as a leak line.

Various implementations and details are described with reference to an example method of calculating a leak safety factor associated with a threaded connection as a function of effective pressure (Pe=P−σn) and von Mises stress ($\sigma_{VM}$). The leak safety factor includes a quadratic expression with three constants: a leak path factor (δ), a thread modulus (α), and a makeup leak resistance (β). The method includes approving the threaded connection if the leak safety factor is greater than a threshold value. In some implementations, the method includes generating at least three leaking test cases with different Dp=Pi−Po, each characterized by a combination of loads expected to result in leak at the threaded connection, to determine the three leak constants. For each leaking test case, the method includes calculating a subset of values including an effective pressure value (Pe) and a von Mises stress value ($\sigma_{VM}$). The method includes fitting a quadratic expression to the subset of values. The resulting quadratic expression includes values for the three constants: the leak path factor (δ), the thread modulus (α), and the makeup leak resistance (β).

The following detailed description includes numerous details and examples that are intended to provide a thorough understanding of the subject matter and its relevant teachings. Those skilled in the relevant art may understand how to apply the relevant teachings without such details. This disclosure is not limited to the specific devices, systems, and methods described because the relevant teachings can be applied or practiced in a variety of ways. The terminology and nomenclature used herein is for the purpose of describing particular aspects only and is not intended to be limiting.

Those skilled in the relevant art will recognize and appreciate that many changes can be made to the various aspects of the implementations described herein, while still obtaining the beneficial results. It will also be apparent that some of the desired benefits can be obtained by selecting some of the features, but not others. Accordingly, those who work in the art will recognize that many modifications and adaptations are possible and may even be desirable in certain applications, and that these are part of the disclosure.

The terms "comprising" and "including," and any forms thereof, are intended to indicate a non-exclusive inclusion; that is, to encompass a list that includes the items listed and may include others not expressly listed. As used herein, the singular forms "a," "an" and "the" include plural referents unless the context clearly dictates otherwise. Thus, for example, reference to a component can include two or more such components unless the context indicates otherwise. Relational terms such as "first" and "second" and the like may be used solely to distinguish one element or action from another, without implying any particular order between such elements or actions.

The terms "optional" or "optionally" mean that the subsequently described element or action may or may not occur. In other words, such a description includes instances where the element or action occurs and instances where it does not.

Then term "facilitate" means to aid, assist, enable, improve, or make easier. The term "inhibit" means to hinder, restrain, impede, restrain, thwart, oppose, or obstruct.

The words "proximal" and "distal" are used to describe items or portions of items that are situated closer to and away from, respectively, a user or a viewer. Thus, for example, the near end or other portion of an item may be referred to as the proximal end, whereas the generally opposing portion or far end may be referred to as the distal end.

As used herein, the term "constant" refers to a quantity or value that represents an inherent property of an object or thing. As opposed to a variable, a constant associated with an object does not change in response to extrinsic states or conditions. For example, the yield strength (Y) of a particular material is a constant.

Currently, the role of hydrostatic pressure in the design of well tubulars is not fully appreciated in the current failure theories for yield, buckling, connection leak, pull-out, or thread fracture. Hydrostatic pressure refers to the pressure exerted by a fluid or fluid-like substance on a body immersed in the substance. The currently used design criteria, failure theories, and equations for tubular design do not depend on hydrostatic pressure.

The total stress at each point in a tubular can be divided into a shear part and a hydrostatic part. The von Mises stress, defined as a scalar measure of the shear part, is used to assess the yield of the pipe material or, more specifically, to assess burst, collapse, tensile failure, and compressive failure of the pipe-body. The Lubinski fictitious force, often called the effective force, is used to evaluate buckling. Both yield and buckling are independent of the hydrostatic part of the stress; i.e., shear behavior alone governs these design criteria.

As part of tubular design, threaded connections, especially proprietary connections, are often evaluated and qualified for strength and sealing with design plots, called connection usage or service envelopes. These envelopes are used similarly to the von Mises ellipse and have the same axes, namely axial force and differential pressure. Laboratory tests and/or FEA (finite element analysis) are performed to develop the envelopes. The leak tests are typically performed with no backup pressure and with loads up to some percent of von Mises yield of the pipe body, so the effect of hydrostatic pressure is not even considered, implying that connection leak depends only on the shear part of the stress, like the pipe body.

The leak envelope for a threaded connection based on laboratory test results, if available, is used for tubular design by assuming that the internal or external pressure can be replaced with the differential pressure. This assumption is not supported by experimental evidence, creates inaccuracy, and eliminates the effect of hydrostatic pressure. Because the hydrostatic effect is disregarded, current connection design is biaxial (at best).

NEW APPROACH: Contrary to current practice, and as demonstrated herein, the leak resistance of a threaded connection is directly dependent on hydrostatic pressure. Hence, leak resistance is a function of the threaded connection's location (depth) in the well string. Tubular analysis using the von Mises equations alone (which assume shear only) does not adequately characterize the risk of leak at a threaded connection.

A new triaxial connection leak criterion is described herein, which includes the effect of hydrostatic pressure in a linear equation. Based on the new leak criterion, a new leak connection safety factor is described for evaluating connections and designing tubulars. A leak line and a leak circle are also described, which provide a graphical representation to quickly identify whether the expected loads are critical and will cause leak.

The tubular stresses can be calculated at every depth (z) based on the internal pressure (Pi), external pressure (Po), and axial force (Fz). (For clarity in small print, these and other denoted variables may appear herein without subscript letters.) This set of conditions—internal pressure (Pi), external pressure (Po), and axial force (Fz)—is known or can be measured or determined, in most cases, including any effect from temperature. As used herein, the depth (z) represents the axial or longitudinal direction along a tubular string, whether the well is solely vertical or not. For a vertical well, the measured depth equals the true vertical depth. For a non-vertical well, the measured depth is greater than the true vertical depth.

The complete description of the stress acting at a material point on a body is a nine-component tensor, which can be expressed as a three-by-three matrix (often depicted as a cube, with one normal stress and two shear stresses on each of the six faces; the stresses on opposing faces are equal). For a well tubular, in cylindrical coordinates, the normal stresses include the radial stress ($\sigma r$), the hoop stress ($\sigma \theta$), and the axial stress ($\sigma z$). The radial stress and hoop stress depend only on the internal pressure (Pi), external pressure (Po), and the inner and outer diameter of the pipe, and can be calculated using the Lamé equations. The axial stress can be calculated from the axial force (Fz), which includes pipe weight, and the cross-sectional area of the pipe. Most tubular design does not consider shear stresses, such as the stress generated by friction between the outer pipe surface and the borehole wall.

HYDROSTATIC PRESSURE: The leak resistance of a threaded connection is directly dependent on hydrostatic pressure. The mean normal stress, P, which is defined as the scalar measure of the hydrostatic part of the stress, is equal to the average of the three normal stresses, as follows, in cylindrical coordinates for a tubular:

$$P = \frac{\sigma_r + \sigma_\theta + \sigma_z}{3}.$$

In fact, by definition, the sum of the three normal stresses is simply the first stress invariant, which itself is a scalar and independent of the coordinate system. This coordinate independence (just as with the von Mises stress, which is the second invariant of the shear part of the stress) is an important feature of the new triaxial leak criterion. In solid mechanics and as used herein, tensile stress is considered positive and compressive stress is negative. The term 'hydrostatic pressure' as used herein is equivalent to negative of the mean normal stress, P, which reduces to the conventional meaning of hydrostatic pressure in certain circumstances; e.g., at the bottom of an open-end tubular in a drilled hole filled with static fluid, all three normal stresses in the tubular at its base are compressive and equal to the negative of the fluid pressure at that depth. In most cases, the three normal stresses at any point along the string and within the tubular wall are not equal. Hence, the mean normal stress, P, is triaxial and generalizes the hydrostatic concept to three dimensions.

TRIAXIAL CONNECTION LEAK CRITERION: The leak behavior of a threaded connection under triaxial stress is fully described by the new connection leak criterion 25:

$$\sigma_{VM} = -\alpha P + \beta \qquad \text{"Triaxial Leak Criterion 25"}$$

where P is the mean normal stress, and where alpha ($\alpha$) and beta ($\beta$) are new connection constants, as described and defined herein. The mean normal stress, P, in the Triaxial Leak Criterion 25 introduces the dependence of leak on hydrostatic pressure—which is fundamental and different from all prior leak theories.

The new Triaxial Leak Criterion 25 is also the basis for a new triaxial leak connection safety factor:

$$SF_{Leak} = \frac{-\alpha P + \beta}{\sigma_{VM}}$$

in which the numerator represents the working limit and the denominator represents the working stress. In practice, as described herein, a designer can approve a threaded connection if the leak safety factor is greater than a threshold value, which is typically a number equal to or greater than one. An additional 'design factor' may be selected by the designer (or imposed by an operator) as an additional margin of safety, in order to account for manufacturing tolerances and the like. For example, a designer or operator may specify 1.25 for the threshold value (which is the number typically used for the pipe body).

The connection constants, alpha ($\alpha$) and beta ($\beta$), represent inherent properties of a particular threaded connection, independent of extrinsic states or conditions. The connection constants for a particular connection are analogous to the material constant for a particular material; for example, the yield strength constant (Y) for a pipe-body material (steel, typically). In fact; if alpha ($\alpha$) equals zero, the hydrostatic dependence is eliminated and the Triaxial Leak Criterion reduces identically to the von Mises criterion (similar to that for the pipe body), and the constant beta (β) is analogous to the yield strength (Y).

Using the known equations (without shear) for von Mises stress ($\sigma_{VM}$) and for mean normal stress (P), the Triaxial Leak Criterion becomes:

$$\sigma_{VM} = \sqrt{\frac{1}{2}\left[(\sigma_r - \sigma_\theta)^2 + (\sigma_\theta - \sigma_z)^2 + (\sigma_z - \sigma_r)^2\right]} = -\alpha\frac{(\sigma_r + \sigma_\theta + \sigma_z)}{3} + \beta.$$

Using the expressions for the axes of the von Mises circle and the Lubinski formula for neutral stress ($\sigma_n$), the Triaxial Leak Criterion becomes:

$$\sqrt{(\Delta P)^2 + (\Delta\sigma_z)^2} = -\alpha\frac{2\sigma_n + \sigma_z}{3} + \beta$$

where ΔP is the y-axis and $\Delta\sigma_z$ is the x-axis of the von Mises circle, and where the mean normal stress (P) is expressed as a function of the Lubinski neutral stress ($\sigma_n$) and the axial stress (σz).

Adding and subtracting the Lubinski neutral stress ($\sigma_n$) in the first term on the right, defining $\Delta\sigma_z$ as Lubinski's "excess axial stress above its neutral value ($\sigma_n$)," and re-arranging terms, the Triaxial Leak Criterion becomes:

$$\sqrt{(\Delta P)^2 + (\Delta\sigma_z)^2} + \frac{\alpha}{3}(\Delta\sigma_z) = -\alpha\sigma_n + \beta.$$

Using the equation for the Lubinski neutral stress ($\sigma_n$), which is a function of the internal radius (a), external radius (b), internal pressure (Pi) and external pressure (Po), the Triaxial Leak Criterion becomes:

$$\sqrt{(\Delta P)^2 + (\Delta\sigma_z)^2} + \frac{\alpha}{3}(\Delta\sigma_z) = \alpha\frac{b^2 p_o - a^2 p_i}{b^2 - a^2} + \beta \quad \text{"Leak Load Equation"}$$

where the internal radius (a) and external radius (b) refer to the dimensions of the threaded connection, not the pipe body. For alpha equals zero, the Leak Load Equation reduces to the equation for the von Mises circle. If the internal pressure (Pi) is equal to the external pressure (Po) and is equal to the pressure exerted by the drilling mud at a depth (mud density (ρ) times depth (z)), then the right side of the equation above becomes (α) (ρ) (z)+β. This demonstrates that leak resistance is dependent on depth (z). Finally, the Leak Load Equation also provides the basis for a graphical representation for leak assessment, as described herein.

Straight algebra can be applied here, as with other yield theories from the field of solid mechanics, to calculate the constants, alpha (α) and beta (β), from simple laboratory tests. The new Triaxial Leak Criterion is similar to the Drucker-Prager yield criterion, which is a three-dimensional, hydrostatic-pressure-dependent model for analyzing stresses, deformation, and failure in materials such as soils, concrete, and polymers. The Coulomb theory is a two-dimensional subset of the Drucker-Prager criterion and has been applied to model the stresses in sand, soils, concrete, and similar materials.

The Coulomb theory includes two material constants: angle of internal friction (φ) and cohesion (c). When compared to the connection constants of a threaded connection, the angle of internal friction (φ) is analogous to alpha (α), which is associated with the geometry of the threads. The cohesion (c) is analogous to beta (β), which is associated with the components of the seal, including the effects of make-up interference and thread compound (for standard API connections) and metal-to-metal seals or elastomer rings with lubricants or other materials (for non-API proprietary connections). Applying the Coulomb failure criterion in the context of the Triaxial Leak Criterion provides a formula for the constants, alpha (α) and beta (β), in terms of the Coulomb constants:

$$\alpha = \frac{2\sin\phi}{\sqrt{3}(3-\sin\phi)}$$

$$\beta = \frac{6c\cos\phi}{\sqrt{3}(3-\sin\phi)}.$$

Alpha (α) is a function of the angle (φ) with no dependence on the cohesion (c). Beta (β) is a function of both the angle (φ) and the cohesion (c).

The determination of the connection constants, alpha (α) and beta (β), can be simplified by setting a number of boundary conditions which, in practice, are useful for designing experimental tests for measuring the values for alpha (α) and beta (β) for a particular connection. As described herein, simple laboratory leak tests can be performed to determine the values for the connection constants.

A FIRST EXAMPLE EXPERIMENT involves placing a threaded connection in a uniaxial testing state, which is characterized by an axial load only—with no internal or external pressure. The axial load includes tension or compression. Thus, the experiment involves two tests. First, exerting an axial force in tension on the threaded connection and measuring the axial tension leak stress (σt) at which leak occurs. Second, exerting an axial force in compression on the threaded connection and measuring the axial compression leak stress (σc) at which leak occurs. In each test, a small but insignificant pressure may be used, to measure or otherwise sense when leak occurs.

The differences in the uniaxial leak stresses generate asymmetry, as predicted by the Drucker-Prager model. The uniaxial asymmetry ratio (m) can be expressed as:

$$m = \frac{\sigma_t}{\sigma_c}.$$

In the context of leak testing, a leak will start when the uniaxial stress (σz) reaches the axial tension leak stress (σt) or the axial compression leak stress (σc). Because the radial stress and hoop stress are zero (since the internal and external pressures are zero), and applying the Leak Load Equation, the formulas for the connection constants can be expressed as:

$\sigma_t(1+\alpha/3)=\beta$ $\sigma_c(1-\alpha/3)=\beta.$

Solving for the connection constants:

$$\alpha = 3\frac{\sigma_c - \sigma_t}{\sigma_c + \sigma_t} = 3\frac{1-m}{1+m}$$

$$\beta = 2\frac{\sigma_c \sigma_t}{\sigma_c + \sigma_t} = 2\frac{\sigma_t}{1+m} = 2\frac{m\sigma_c}{1+m}.$$

As shown, the constants, alpha ($\alpha$) and beta ($\beta$), can be calculated based on an experiment that measures the axial tension leak stress ($\sigma t$) and the axial compression leak stress ($\sigma c$). This is fully analogous to the simple uniaxial tension test for determining yield strength (Y) for the pipe body, except two tests are required for the threaded connection because there are two constants.

The uniaxial asymmetry ratio (m) can be expressed as:

$$m = \frac{1 - (\alpha/3)}{1 + (\alpha/3)}.$$

Consideration of this formula for the uniaxial asymmetry ratio (m) demonstrates the role of alpha ($\alpha$) and beta ($\beta$). If alpha is zero, then the ratio (m) equals one and the uniaxial leak limits for tension and compression are equal. (When alpha equals zero in the Triaxial Leak Criterion, the effect of the mean normal stress (P) is zero, and the von Mises stress equals beta). As alpha increases for a given beta, the axial tension leak stress ($\sigma t$) decreases and the axial compression leak stress ($\sigma c$) increases. For a given alpha, the two uniaxial leak stresses can only increase if beta increases.

These relationships confirm that the constant alpha ($\alpha$) represents an internal property (namely, the geometry and behavior of the threads), and the constant beta ($\beta$) represents an external property (the seal elements, including makeup).

For a threaded connection, the constant alpha ($\alpha$) is a dimensionless stress ratio that characterizes the thread behavior, as well as the taper, to transfer the load and displacement across the threads. In this aspect, the constant alpha ($\alpha$) is a measure of the leak resistance ability of the threads and the taper. Accordingly, as used herein, the new connection constant alpha ($\alpha$) is referred to as the Thread Modulus.

The constant beta ($\beta$) is related to the ability of the seal to resist leak. According to the equations above: when beta equals zero, both the axial tension leak stress ($\sigma t$) and the axial compression leak stress ($\sigma c$) equal zero. In other words, when there is no beta (i.e., no seal to resist leak), then no axial load can be supported by the connection without resulting in leak. In this aspect, the constant beta ($\beta$) is a measure of the leak resistance ability of the seal. Accordingly, as used herein, the new connection constant beta ($\beta$) is referred to as the Makeup Leak Resistance.

A SECOND EXAMPLE EXPERIMENT for testing a threaded connection involves placing a threaded connection in a pressurized testing state, which is characterized by known internal and external pressures—with zero axial load. As with the uniaxial tests, this experiment involves two tests (to determine the two connection constants). First, exerting an external test pressure (Po) on the threaded connection is used to measure the external leak pressure (Pb) at which external leak occurs. Second; exerting an internal test pressure (Pi) is used to measure the internal leak pressure (Pa) at which internal leak occurs.

For the external leak test, the axial load is zero, the internal pressure (Pi) is zero, and the external pressure (Po) is equal to the external leak pressure (Pb) at the outer radius (b). With these conditions, the Leak Load Equation after re-arranging terms becomes:

$$P_b\left(1 - \frac{\alpha}{3}\right) = \beta\frac{b^2 - a^2}{2b^2}$$

where the internal radius (a) and external radius (b) refer to the dimensions of the threaded connection.

For the internal leak test, the axial load is zero, the external pressure (Po) is zero, and the internal pressure (Pi) is equal to the internal leak pressure (Pa) at the inner radius (a). With these conditions, the Leak Load Equation after re-arranging terms becomes:

$$P_a\left(K + \frac{\alpha}{3}\right) = \beta\frac{b^2 - a^2}{2a^2}$$

where K is a geometric quantity based on the inner radius (a) and the outer radius (b), according to the equation:

$$K = \frac{1}{2}\sqrt{1 + 3\frac{b^4}{a^4}}.$$

Defining a pressure asymmetry ratio (n) is useful in solving for alpha ($\alpha$) and beta ($\beta$) in the leak pressure relations above (for Pa and Pb). The pressure asymmetry ratio (n) is based on the internal leak pressure (Pa) at which leak occurs, and the external leak pressure (Pb) at which leak occurs, according to the equation:

$$n = K\frac{a^2 P_a}{b^2 P_b}.$$

Using the pressure asymmetry ratio (n), alpha ($\alpha$) and beta ($\beta$) can be determined. The Thread Modulus ($\alpha$) is calculated according to the equation:

$$\alpha = 3K\frac{1-n}{K+n}.$$

The Makeup Leak Resistance ($\beta$) is calculated according to the equation:

$$\beta = 2P_b\left(\frac{n(K+1)}{K+n}\right)\left(\frac{b^2}{b^2 - a^2}\right) = 2P_a\left(\frac{K(K+1)}{K+n}\right)\left(\frac{a^2}{b^2 - a^2}\right).$$

As described herein, the Thread Modulus ($\alpha$) and the Makeup Leak Resistance ($\beta$) can be measured objectively by experimentation—involving only two tests. The constants ($\alpha$, $\beta$) for a particular threaded connection do not change. Therefore, the constants ($\alpha$, $\beta$) measured using the pressurized testing state will be identical to the constants ($\alpha$, $\beta$) measured using the uniaxial testing state. Other test conditions may be applied to a threaded connection, resulting in the same measurements for the constants ($\alpha$, $\beta$).

A threaded connection can withstand differential pressures higher than current API ratings because of the effects of hydrostatic pressure. Internal and external pressures close the connection and "energize" (enhance) the seal; axial loads open or "dilate" the connection and reduce the seal. Formulated from the new Triaxial Leak Criterion, a leak line and a leak circle are also introduced for assistance in tubular design, to help designers easily and quickly identify critical loads for leak and, together with the leak safety factor plot versus depth (see FIG. 3) for one or more critical load cases, determines the location where leak is most likely to occur along the string.

The leak line and leak circle are more comprehensive and more accurate than existing leak envelopes because the new Triaxial Leak Criterion applies to all combinations of internal pressure, external pressure, and axial tension or compression—as opposed to the simple load combinations (without backup pressure) derived from the currently used lab tests or simulations using finite-element analysis. Additionally, the new leak line and leak circle plots can be easily developed for both API connections and non-API proprietary connections.

LEAK LINE: The Triaxial Leak Criterion is written in the classical form of a linear equation; namely, y=mx+b, where m is the slope of the line and b is the y-axis intercept. Accordingly, on a graph where the horizontal or x-axis represents values for mean normal stress (P) and the vertical or y-axis represents values for von Mises stress ($\sigma_{VM}$), the slope of the leak line 200 is alpha ($\alpha$, the Thread Modulus) and the y-intercept is beta ($\beta$, the Makeup Leak Resistance), as shown in FIG. 1.

FIG. 1 is a graphical representation of the Triaxial Leak Criterion 25 for a particular threaded connection. The leak line 200 is plotted according to the Triaxial Leak Criterion 25, which is displayed in FIG. 1 for reference.

The Thread Modulus ($\alpha$) and the Makeup Leak Resistance ($\beta$) can be determined through experimentation, as described herein. These constants ($\alpha$, $\beta$) do not change. The leak line 200 for a threaded connection will always have a slope equal to the Thread Modulus ($\alpha$) and a y-intercept equal to the Makeup Leak Resistance ($\beta$). In general, the leak risk is high for data points plotted on the graph that appear near or above the leak line 200; the leak risk is low for points significantly below the leak line 200.

In practice, the same threaded connection is used for all pipe joints in a well string. This minimizes the risk of error in the field during assembly. Accordingly, a tubular typically consists of the same OD, ID, grade (yield strength), and threaded connection along its entire length. Sometimes a tubular has two or more sections, wherein each section has the same parameters (OD, ID, grade (yield strength), and threaded connection) throughout the section.

The leak line 200 (and leak circle, described herein) apply to a section which has the same parameters. Accordingly, the Thread Modulus ($\alpha$) and the Makeup Leak Resistance ($\beta$) are the same at all points in the section. Therefore, along the length of a section of the string, the only variables are the set of conditions—internal pressure (Pi), external pressure (Po), and axial force (Fz)—for a given load case.

A load case, as used herein, refers to a set of conditions (pressures and forces) that are expected to occur or may occur in the field during the lifetime of the well. Different load cases are based on different load types, such as evacuation or gas kick. A load case includes a profile of conditions—internal pressure (Pi), external pressure (Po), and axial force (Fz)—at each point (depth, z) along the string (or section of a string). Those load values can be used to calculate the mean normal stress (P) and the von Mises stress ($\sigma_{VM}$) at each depth (z) along the string, for each load case.

For example, in FIG. 1, the locus of loads 401 on the graph is a plot of the pair of values (P, $\sigma_{VM}$) at every depth (z) along a string for a first load case. The locus of loads 402 shows the values for a second load case; and so on. A locus of loads may be plotted for several different load cases, as shown in FIG. 1, which provides the designer with a visual tool for assessing the relative leak risk among different load cases.

Each locus of loads is plotted as a continuous line because a connection can be situated anywhere along the tubular string. For analytical purposes, the fact that the threaded connections are spaced apart is not important. The precise location of each threaded connection is typically not part of the well planning process because the actual location, in the field, can and will vary.

The curvilinear line for each locus of loads represents the relative leak risk of a particular threaded connection at each location along the string, relative to the leak line 200. If the locus of loads for any load case is near or above the leak line 200, then the leak risk for that load case is high for a string that uses that particular threaded connection. The designer may also refer to the plot of the leak safety factor versus depth, for that load case, to determine the location (or locations) along the string where the leak risk is high.

If the leak risk for any load case is higher than acceptable, the well designer may select a second threaded connection for use; and then repeat the steps of calculating and plotting the pairs of values (P, $\sigma_{VM}$) for various load cases. Note: the leak line will be different because the second threaded connection has its own unique Thread Modulus ($\alpha$) and Makeup Leak Resistance ($\beta$) (and the outer diameter of the second threaded connection may also be different). In this aspect, the leak line graph shown in FIG. 1 provides a tool for designers to evaluate different threaded connections with different load cases.

Figure 2:
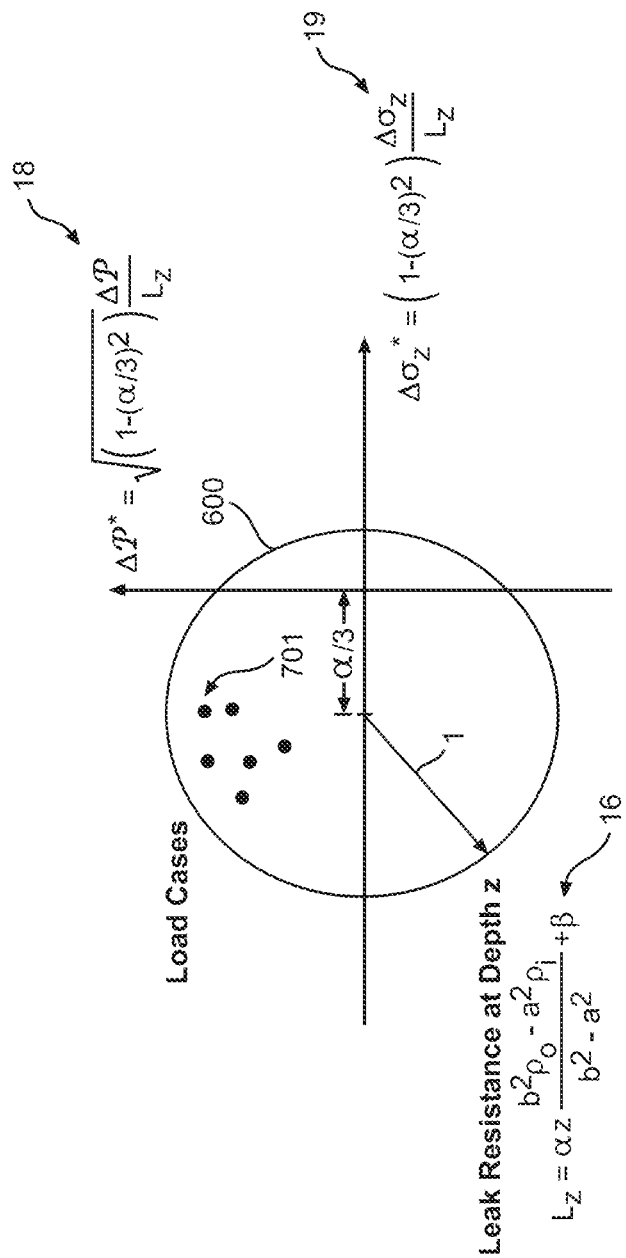
FIG. 2 is a graphical representation of a triaxial connection leak criterion, plotted as a leak circle.

LEAK CIRCLE. Like the leak line 200 shown in FIG. 1, the leak circle 600 shown in FIG. 2 applies to a string of pipe with the same threaded connection. The graph in FIG. 2 is similar to the von Mises circle, except the formulas for each axis have been adjusted in accordance with the new Triaxial Leak Criterion 25. If the von Mises circle axes were used without adjustment, then a different circle radius for each depth and each load case would be required.

The fluid pressures (Pi, Po) acting on a threaded connection vary with depth (z). The Leak Load Equation is an expression of the Triaxial Leak Criterion which includes internal and external pressures (Pi, Po). By assuming that the pressures (on the right side of the Leak Load Equation) at each depth (z) along the string can be approximated for all load cases by an equivalent fluid density at depth (z), and by using the internal and external densities ($\rho i$, $\rho o$), the Leak Load Equation becomes:

$$\sqrt{(\Delta P)^2 + (\Delta \sigma_z)^2} + \frac{\alpha}{3}(\Delta \sigma_z) = \alpha z \frac{b^2 \rho_o - a^2 \rho_i}{b^2 - a^2} + \beta$$

where $\Delta P$ includes the differential pressure and $\Delta$ is the excess axial stress. The right side of the above equation defines the leak resistance at depth (z):

$$L_z = \alpha z \frac{b^2 \rho_o - a^2 \rho_i}{b^2 - a^2} + \beta \qquad \text{"Leak Resistance at Depth z"}$$

which is displayed (16) on FIG. 2 for reference. Dividing the preceding equation by (Lz) on both sides provides the dimensionless result:

$$\sqrt{(\Delta P/L_z)^2 + (\Delta\sigma_z/L_z)^2} + \frac{\alpha}{3}(\Delta\sigma_z/L_z) = 1.$$

Completing the square and re-arranging terms provides the formulas for the axes for the graph in FIG. 2; namely, $\Delta P^*$ for the y-axis and $\Delta\sigma_z^*$ for the x-axis:

$$\Delta P^* = \sqrt{1 - (\alpha/3)^2} \frac{\Delta P}{L_z}$$

$$\Delta\sigma_z^* = \sqrt{1 - (\alpha/3)^2} \frac{\Delta\sigma_z}{L_z}$$

where $\Delta P^*$ is the normalized differential pressure and $\Delta\sigma_z^*$ is the normalized excess axial stress. These normalized values are dimensionless because of (Lz). These values are described as 'normalized' because, compared to $\Delta P$ and $\Delta\sigma_z$, the normalized values include the effect of the Thread Modulus ($\alpha$) and the Makeup Leak Resistance ($\beta$).

Values for normalized differential pressure ($\Delta P^*$) are displayed on the y-axis of the graph in FIG. 2. Values for normalized excess axial stress ($\Delta\sigma_z^*$) are displayed on the x-axis. The normalized differential pressure equation 18 is displayed in FIG. 2 for reference. The normalized excess axial stress equation 19 is also displayed in FIG. 2 for reference. Then, $$(\Delta P^*)^2 + (\Delta\sigma_z^* + \alpha/3)^2 = 1$$

is the formula for the leak circle 600, which is centered on the x-axis at $\Delta P^* = 0$ and $\Delta\sigma_z^* = -\alpha/3$, and has a radius equal to one, as shown in FIG. 2.

If alpha equals zero, the leak circle reduces to the von Mises circle, which has a radius of one and is centered at the origin of the axes, which are $\Delta P^*$ and $\Delta\sigma_z^*$ of the leak circle 600 as expressed above.

FIG. 2 is a graphical representation of the leak circle 600 at a particular depth (z) along the string. Each depth (z) along the string will have its own leak circle. Each load case involves the same threaded connection and has a pair of values ($\Delta P^*$, $\Delta\sigma_z^*$), calculated using the equations above. Plotting the pair of values on the graph will display a load case point 701, which represents the relative leak risk at depth (z) for a particular load case (and a string with a particular threaded connection) relative to the leak circle 600.

The other load case points represent the pair of values ($\Delta P^*$, $\Delta\sigma_z^*$) for other load cases. The plot in FIG. 2 shows six different load cases relative to the leak circle 600. This graph helps the designer select the best threaded connection to withstand all load cases without leaking.

The leak risk is low for load case points plotted significantly inside the leak circle 600; points near or outside the leak circle 600 have a high leak risk. The closer a point is to the leak circle 600, the higher the risk of leak (for that load case, and connection).

Figure 3:
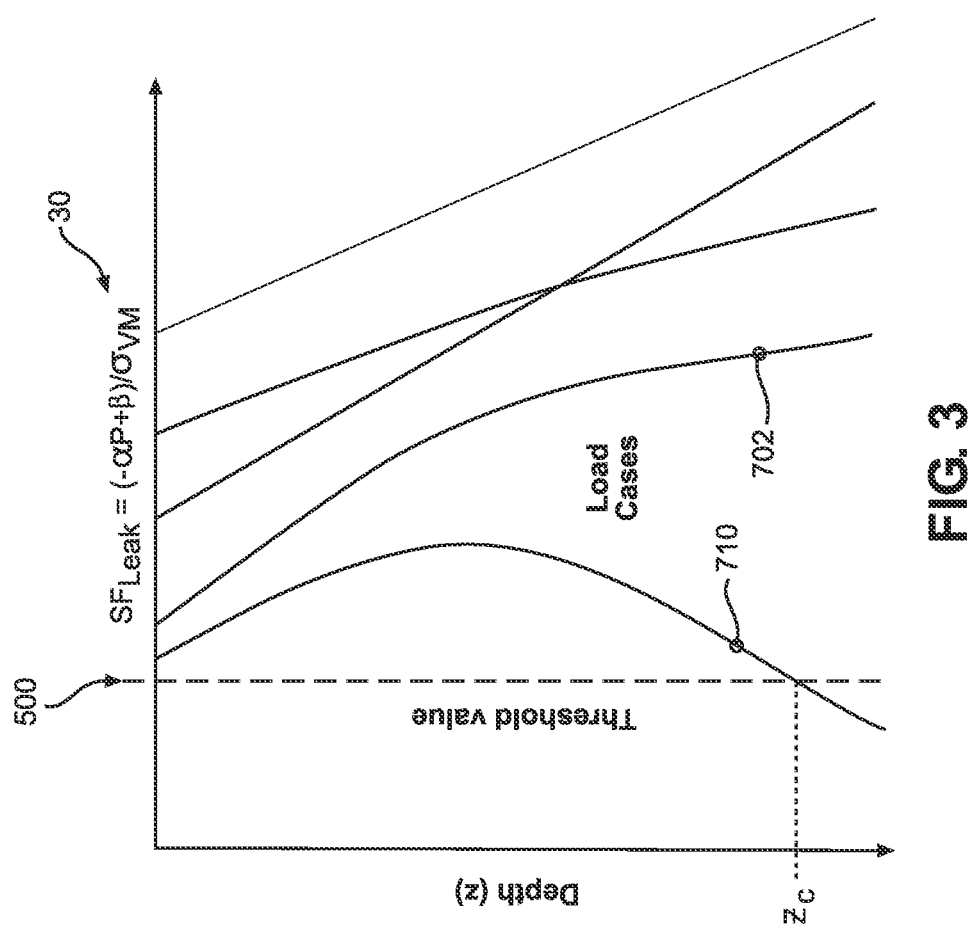
FIG. 3 is a graphical representation of a leak safety factor for a particular string, including a load case line for a number of load cases.

LEAK SAFETY PLOT: If one or more load case points are near the leak circle 600 in FIG. 2 (and/or one or more locus of loads 401 is near the leak line 200 in FIG. 1), the designer may select one or more load cases for additional scrutiny. FIG. 3 is a plot of the leak safety factor ($SF_{Leak}$) on the x-axis versus depth (z) on the y-axis for a particular string. The leak safety equation 30 is displayed for reference.

FIG. 3 includes a line representing a threshold value 500. Typically, the threshold value 500 represents a leak safety factor that is equal to or greater than one. An additional 'design factor' may be selected by the designer, as an additional margin of safety. For example, a designer or operator may specify a threshold value 500 equal to 1.25 (which is the number typically used for the pipe body).

One or more load cases may be selected for display on the leak safety plot shown in FIG. 3. Each string will have its own leak safety plot. For each load case selected, the value of the leak safety factor (SFLeak) can be calculated for each depth (z) along the string and plotted, as shown in FIG. 3. Five different load case lines are shown.

The closer the line is to the threshold value 500, the higher the leak risk. The load case lines provide a visual representation of the relative leak risk, which may include load cases that do not meet the threshold value 500 for leak safety. For example, the load case line 710 crosses the line representing the threshold value 500, indicating a high risk of leak. The leak safety plot also displays the depth at which leak is expected to occur for a load case. Load case line 710, for example, is expected to leak at or near a critical depth (zc).

The load case lines also provide a visual representation of the leak risk relative to other load cases. For example, load case line 702 indicates a higher safety factor compared to load case line 710 at all depths. In this aspect, the graph may be used for a visual assessment of a plurality of load cases, beginning with a first load case and first load case line, and then subsequently evaluating and plotting other load case lines.

Just as one characteristic constant (yield strength, Y) has been used historically to evaluate the mechanical limits of the pipe-body material, the two characteristic connection constants described herein—the Thread Modulus ($\alpha$) and the Makeup Leak Resistance ($\beta$)—may be used to evaluate the mechanical limits for leak of threaded connections. Without the new Triaxial Leak Criterion described herein, well designers, operators, and connection suppliers will continue to use: (a) expensive testing methodology and FEA to qualify threaded connections, and (b) approximate safety factors, when selecting connections for specific applications. Neither (a) nor (b) currently consider hydrostatic dependence of connection performance. The new Triaxial Leak Criterion with two constants introduces the dependence on hydrostatic pressure, which is fundamental and different from all prior connector theories. The new Triaxial Leak Criterion has a key assertion—mechanical failure in all threaded connectors depends on hydrostatic pressure.

The technology disclosed herein may be used to reduce qualification testing and computer stress analysis (FEA) of threaded connections—with more efficient extrapolation across different connection types and sizes. The technology may also facilitate the optimized selection and placement of lower-cost threaded connections, resulting in structural efficiencies and cost savings. The technology may also facilitate the development and design of new types of threaded (and non-threaded) connections to optimize the connection constants, alpha ($\alpha$) and beta ($\beta$). Further, the technology may facilitate the development and use of new leak safety factors for connections, which will lead to more reliable and cost-efficient well designs. This technology is applicable to not only well designs, but also to any application in any industry that requires efficient performance of conduits with connections that have separable male-female parts (not welded) and that seal between internal and external environments. Even for non-sealing applications, such as solid (or non-solid) rods or columns with threaded connections, the new Triaxial Leak Criterion with dependence on the mean normal stress applies to structural failure of the threaded connections, such as from pullout or thread fracture.

Connection Stresses at the Pin-Box Interface: The leak behavior of a threaded connection under triaxial stress is fully described by the triaxial connection leak criterion, as described herein.

$$\sigma_{VM} = -\alpha P + \beta$$  "Triaxial Leak Criterion 25".

For the Triaxial Leak Criterion 25, the von Mises stress ($\sigma_{VM}$) is a linear function of the mean normal stress (P) in which the slope is alpha ($\alpha$, the Thread Modulus) and the y-intercept is beta ($\beta$, the Makeup Leak Resistance). FIG. 1 is a graphical representation of an example leak line 200 plotted according to the Triaxial Leak Criterion 25 for an example threaded connection.

For a pipe body with no bending, the von Mises stress ($\sigma_{VM}$) is equal to the yield strength Y of the pipe material. In practice, the yield strength Y is determined from a uniaxial tensile test on a small rod specimen until it yields. For both types of yield (e.g., burst and collapse) the von Mises stress ($\sigma_{VM}$) is at its maximum at the inner diameter (ID). The leak must pass through the pipe body at the ID whether it originates internally or externally.

For threaded connections, the pin and box are offset axially, which means that an axial force F will generate a thread shear stress at the pin-box interface.

FIG. 4 is a cross-sectional view of an example tubing or casing coupled connection 400 (e.g., API or premium) having a radial interference seal. This view of an example connection 400 includes an upper pin 410, a lower pin 412, and a box 420. The conditions, as shown, include the axial force (F), internal pressure (Pi), and external pressure (Po), each of which is known or can be measured or calculated. $A_{pin}$ represents the cross-sectional area of the pin 410, 412 which is exposed to the internal pressure (Pi). $A_{box}$ represents the cross-sectional area of the box 420 which is exposed to the external pressure (Po).

The radius (a) is correlated with the inner diameter (ID) of the threaded connection, where the calculations were conducted for a pipe body with no bending. The radius (c) is correlated with the outer diameter of the connection. The radius (b) represents the radius associated with the pin-box interface. In some example implementations, the pin-box interface radius (b) is correlated with the pitch diameter (i.e., the diameter where the thread thickness is equal to the space between the threads). For some threads, the pitch diameter coincides with the geometric center of the thread flank (the sloping side of the thread). In some implementations, the pin-box interface radius (b) is equal to the radius on the pitch line at a specified location (distance from pin end) when the connection is hand-tight. The pitch diameter is a known value provided by the manufacturer or it can be reasonably estimated. For example, for API connections, the pitch diameter is specified at the location L1 for API 8-round or L7 for API buttress.

FIG. 5 is a cross-sectional view of an example drill string connection 450 having an axial interference shoulder seal. This view of an example connection 450 includes a pin 510 and a box 520. Ai represents the cross-sectional area of the pin 510 which is exposed to the internal pressure (Pi). Ao represents the cross-sectional area of the box 520 which is exposed to the external pressure (Po).

There are three stress mechanisms common to all tubular threaded connections, including the example connections 400, 450 shown in FIG. 4 and FIG. 5, respectively.

First; the seal design impacts the stresses generated in a threaded connection. The Triaxial Leak Criterion 25 for connections, $$\sigma_{VM} = -\alpha P + \beta$$

assumes that the seal and makeup behavior is completely characterized by the two constants, alpha and beta, which are different for different connections. The actual sealing mechanism is complex and varies, including, for example, thread seals, elastomer seals, or metal-to-metal seals (for connections like the example connection 400 in FIG. 4) or rotary shoulder seals (for connections like the example drill string connection 450 in FIG. 5).

Second; because of the seal, hydrostatic pressure is a key driver for evaluating leak resistance. Without a seal, the pressures (internal and external) would penetrate the threads and load the pin and box equally on all surfaces. When a seal is present, even an open-ended connector submerged in a pressure chamber would experience shear.

Finally; because the pin and box are offset axially, the axial force F will generate thread shear. Thread shear generates dilatancy associated with flank angles, meaning the connection opens, decreasing leak resistance. The dilatancy behavior is similar to that in sand and soils which dilate when sheared. Even without an axial force F, the internal pressure Pi alone generates a pin-end force, as shown in FIG. 4 and FIG. 5.

For axisymmetric stresses with longitudinal thread shear stress ($\tau$) (tau), the von Mises stress ($\sigma_{VM}$) is calculated from the expression:

$$\sigma_{VM} = \sqrt{\frac{1}{2}\left[(\sigma_r - \sigma_\theta)^2 + (\sigma_\theta - \sigma_z)^2 + (\sigma_z - \sigma_r)^2\right] + 3\tau^2}.$$

For casing connections, like the example connection 400 in FIG. 4, the radial stress ($\sigma r$) and the hoop stress ($\sigma \theta$) at the pin-box interface radius (b) are determined using constants A and B from the Lamé equations:

$$\sigma_r = A - \frac{B}{b^2}$$

$$\sigma_\theta = A + \frac{B}{b^2}$$

$$A = \frac{a^2 P_i - c^2 P_o}{c^2 - a^2}, \quad B = \frac{a^2 c^2 (P_i - P_o)}{c^2 - a^2}$$

and it follows that, $$\frac{\sigma_r + \sigma_\theta}{2} = A = \sigma_n$$

where A or $\sigma n$ is the neutral axial stress, as defined by Lubinski, and represents the mean normal stress in the connection cross-section.

Using the equations above for the von Mises stress ($\sigma_{VM}$) and the mean normal stress ($\sigma n$), a new Leak Criterion with Thread Shear 425 in some implementations is expressed as:

$$\sqrt{\left(\sqrt{3}\Delta p \left(\frac{c^2}{c^2-a^2}\right)\frac{a^2}{b^2}\right)^2 + (\Delta\sigma_z)^2 + 3\tau^2} + \frac{\alpha}{3}\Delta\sigma_z = -\alpha\sigma_n + \beta.$$

In practice, as described herein, a designer can approve a threaded connection if the leak safety factor based on von Mises stress with thread shear is greater than a threshold value, which is typically a number equal to or greater than one. An additional 'design factor' may be selected by the designer (or imposed by an operator) as an additional margin of safety, in order to account for manufacturing tolerances and the like. For example, a designer or operator may specify 1.25 for the threshold value.

The Leak Criterion with Thread Shear 425 generates a circle when alpha is zero and the shear stress (tau) is zero. When plotted on a graph in which the abscissa value (along the x-axis) is the effective stress ($\Delta\sigma z = \sigma z - \sigma n$) and the ordinate value (along the y-axis) is the differential pressure ($\Delta p$) quantity in the bracket, the radius of the circle is beta.

For a non-zero alpha and a shear stress (tau) of zero, the Leak Criterion with Thread Shear 425 generates a displaced circle with its center located at (negative-alpha divided by 3) on the dimensionless abscissa. The circle radius depends on the neutral axial stress ($\sigma n$). Accordingly, the Leak Criterion with Thread Shear 425, applied over a series of threaded connections, would generate a series of displaced circles each having a different radius for each depth (z).

When the neutral axial stress ($\sigma n$) is replaced with the equivalent expression in terms of differential pressure ($\Delta p$) and backup pressure, the Leak Criterion with Thread Shear 425 generates a customary skewed ellipse when plotted on axes of differential pressure ($\Delta p$) and axial stress ($\sigma z$). For external leak with a backup pressure (Pi) the abscissa becomes ($\sigma z$+Pi), which is like pipe collapse and demonstrates the dual and equal dependence on axial stress ($\sigma z$) and backup pressure (Pi).

For the square-root quantity in the Leak Criterion with Thread Shear 425, the leak rating ($\Delta p$) decreases as the effective stress ($\Delta\sigma z = \sigma z - \sigma n$) or the shear stress (tau) increases. This relationship means that leak is derated for axial force (F), backup pressure (Pi), and thread shear stress (tau). The API equation for internal leak does not include any of these effects.

The axial stress ($\sigma z$) at any location in a threaded connection is not determined from axial force (F) alone. The internal pressure (Pi) exerts forces on the internal surfaces of the pin as shown in FIG. 4 and FIG. 5. The external pressure (Po) exerts forces on the external surfaces.

The axial force (Fb) at the mid-point of the box may be expressed as:

$$F_b = F + P_i A_{pin} - P_o A_{box}$$

where $A_{pin}$ represents the exposed end area of the pin and $A_{box}$ represents the exposed end area of the box.

The average axial stress ($\sigma z$) in the thread region may be expressed as:

$$\sigma_z = \frac{F - P_o A_{box}}{A_{con}} = \frac{F_b - P_i A_{pin}}{A_{con}}$$

where $A_{con}$ represents the cross-sectional area of the connection. The connection area may be calculated using $A_{con} = \pi(c^2 - a^2)$.

The axial force along the surface of the pin varies from tension (F) at the pipe end (e.g., the lower end of the lower pin 412, as shown in FIG. 4) to compression (−Pi $A_{pin}$) at the nose end of the pin (e.g., the internal surface of the lower pin 412). This change in force along the pin equals [F−(−Pi $A_{pin}$)], so the thread shear stress (tau) along the engaged thread length ($L_t$) may be expressed as:

$$\tau = \frac{F + P_i A_{pin}}{A_t} = \frac{F_b + P_o A_{box}}{A_t}$$

where $A_t$ is the engaged thread area over which the shear stress (tau) acts. The engaged thread area may be calculated using $A_t = 2\pi b L_t$, where the engaged thread length ($L_t$) is a known value provided by the manufacturer or it can be measured or estimated. As expressed in the equation above, the shear stress (tau) acting on the pin is equal to the shear stress acting on the box. The force along the surface of the box varies from tension (i.e., a box force $F_b$ acting at the box midpoint) to compression (−Po $A_{box}$) at the box end. The axial forces acting on the pin and box generate the shear stress (tau) between the pin and box.

For known values of force (F), internal pressure (Pi), and external pressure (Po), the three normal stresses and the thread shear stress (tau) may be calculated, starting with the Lamé equations above.

The von Mises stress ($\sigma_{VM}$), as described above, may be calculated from the expression:

$$\sigma_{VM} = \sqrt{\frac{1}{2}\left[(\sigma_r - \sigma_\theta)^2 + (\sigma_\theta - \sigma_z)^2 + (\sigma_z - \sigma_r)^2\right] + 3\tau^2}.$$

The mean normal stress (P), as described above, may be calculated from the expression:

$$P = \frac{\sigma_r + \sigma_\theta + \sigma_z}{3}.$$

Applying the Triaxial Leak Criterion 25, $$\sigma_{VM} = -\alpha P + \beta$$

the values of the two constants, alpha and beta, are needed in order to calculate the connection leak safety factor ($SF_C$):

$$SF_c = \frac{-\alpha P + \beta}{\sigma_{VM}}$$

in which the numerator represents the working limit, and the denominator represents the working stress. In practice, as described herein, a designer can approve a threaded connection if the leak safety factor is greater than a threshold value, which is typically a number equal to or greater than one. An additional 'design factor' may be selected by the designer (or imposed by an operator) as an additional margin of safety, in order to account for manufacturing tolerances and the like. For example, a designer or operator may specify 1.25 for the threshold value.

The two constants, alpha and beta, can be determined using one or more tests in which a number of values and conditions are known (or readily measured).

First Test Method: For example, two leak tests conducted on a known connection exposed to uniaxial force (F), no internal pressure (Pi=0), and no external pressure (Po=0) can be used to determine the constants, alpha and beta.

Using an API 7-inch 35-ppf N80 LTC connection as an example case, the following data are known: inner radius (a)=3.002 inches; pin-box interface radius (b)=3.452 in.; outer radius (c)=3.9375 in.; engaged thread length ($L_t$)=3.296 in.; exposed pin area ($A_{pin}$)=7.164 in$^2$; and exposed box area ($A_{box}$)=11.023 in$^2$. Finite-element analysis (FEA) predicts that the N80 connection will open sufficiently to leak when the force in tension (T)=620 kips (i.e, 620,000 lbf) or when the compression (C)=690 kips. Note: the difference between the tensile and compressive limits demonstrates the hydrostatic effect (even when there is no applied internal or external pressure). The mean normal stress (P), using the expression above, when only axial stress ($\sigma z$) is present, may be calculated using the expression, P=$\sigma z$/3, which further demonstrates that axial stress alone is sufficient to cause the hydrostatic effect.

The difference between the uniaxial tensile and compressive limits also demonstrates that the von Mises stress equation alone, with only a single constant, would be insufficient to characterize connection leak risk because the von Mises equation requires the uniaxial limits to be equal in magnitude. FEA analysis confirms the difference in limits. The Triaxial Leak Criterion 25 demonstrates that two constants are required to characterize a connection leak risk.

A uniaxial asymmetry ratio (m) can be used to determine the constants, alpha and beta.

$$m = \frac{\sigma_T}{\sigma_C} = \frac{T}{C}$$

where the tensile stress ($\sigma_T$) equals the tension (T) divided by the cross-sectional area ($A_{con}$) of the LTC connection, and the compressive stress ($\sigma_C$) equals the compression (C) divided by the cross-sectional area ($A_{con}$) of the LTC connection.

In laboratory testing, a uniaxial leak test can be conducted with either a small amount of pressure or with some nonmechanical sensor. For uniaxial test conditions with a small pressure for leak detection, internal pressure (Pi) is considered zero and external pressure (Po) is considered zero; therefore, the differential pressure ($\Delta p$) is zero and the neutral axial stress ($\sigma n$) is zero.

For uniaxial tension, the tensile leak limit is reached when the uniaxial stress ($\sigma z$) reaches the tensile stress ($\sigma_T$). For tension, the Leak Criterion with Thread Shear 425 reduces to:

$$\sigma_T \left[ \sqrt{1 + 3\left(\frac{A_{con}}{A_t}\right)^2} + \frac{\alpha}{3} \right] = \beta.$$

For uniaxial compression, the compressive leak limit is reached when the uniaxial stress ($\sigma z$) reaches the compressive stress (negative ($-\sigma_C$)). For compression, the Leak Criterion with Thread Shear 425 reduces to:

$$\sigma_C \left[ \sqrt{1 + 3\left(\frac{A_{con}}{A_t}\right)^2} - \frac{\alpha}{3} \right] = \beta.$$

Defining a uniaxial test constant (S), $$S = \sqrt{1 + 3\left(\frac{A_{con}}{A_t}\right)^2}$$

and solving for alpha and beta, the Thread Modulus alpha ($\alpha$) equals:

$$\alpha = 3\frac{1-m}{1+m}S$$

and the Makeup Leak Resistance beta ($\beta$) equals:

$$\beta = \sigma_T\left(\frac{2}{1+m}\right)S = \left(\frac{T}{A_{con}}\right)\left(\frac{2}{1+m}\right)S$$

or $$\beta = \sigma_C\left(\frac{2m}{1+m}\right)S = \left(\frac{C}{A_{con}}\right)\left(\frac{2m}{1+m}\right)S.$$

Solving for the uniaxial asymmetry ratio (m) from the equation above for alpha, $$m = \frac{S - (\alpha/3)}{S + (\alpha/3)}$$

which means the ratio (m) is between zero and one ($0 \leq m \leq 1$) and the Thread Modulus alpha ($\alpha$) is between zero and {three times S} ($0 \leq \alpha \leq 3S$) in cases where alpha is positive. The value of alpha may be negative for certain load conditions and certain types of connections.

For the example LTC connection, and the FEA limits for tension (T=620 kips) and compression (C=690 kips), the ratio (m) is 0.899 and the uniaxial test constant (S) is 1.115. According to the equations above, the Thread Modulus alpha ($\alpha$) is 0.179 and the Makeup Leak Resistance beta ($\beta$) is 35,720 psi.

Although the values for alpha and beta were calculated based on the example uniaxial test conditions described above, the Thread Modulus alpha ($\alpha$) and the Makeup Leak Resistance beta ($\beta$) are considered to be constant values associated with the example LTC connection, under any conditions, including field conditions. Accordingly, the constant values for alpha and beta are expected to be the same under different test conditions.

Second Test Method: In another example test, the two constants, alpha and beta, can be determined when a number of values and conditions are known or readily measured. In this second test method, two pressure tests are used. An internal leak test is conducted on a known connection exposed to a zero uniaxial force (F=0), no external pressure (Po=0), and a known internal leak pressure (Pi=Pa). The internal pressure (Pi) equals the leak pressure (Pa) at the inner radius because internal leak would occur at the inner radius (a). Under these conditions, the axial stress ($\sigma z$) in the thread region is zero.

An external leak test is conducted on a known connection exposed to a zero uniaxial force (F=0), no internal pressure (Pi=0), and a known external leak pressure (Po=Pc). The external pressure (Po) equals the external leak pressure (Pc) at the outer radius because external leak would occur at the outer radius (c). Under these conditions, the shear stress (tau) is zero because the force is zero (F=0) and the internal pressure is zero (Pi=0).

The equations for internal and external leak can be simplified by using and calculating a number of pressure-test constants ($K_0$, $K_1$, $K_2$, and $K_3$) which are unitless and based on the geometry of the connection:

$$K_0 = 1 - \left(\frac{c^2 - a^2}{c^2}\right)\left(\frac{A_{box}}{A_{con}}\right)$$

$$K_1 = \frac{1}{2}\sqrt{3\left(\frac{a}{b}\right)^4 + (K_0^2)^4}$$

$$K_2 = \frac{1}{2}(3 - K_0)$$

$$K_3 = \frac{1}{2}\sqrt{1 + 3\left(\frac{c}{b}\right)^4 + 3\left(\frac{A_{pin}}{A_t}\right)^2\left(\frac{c^2 - a^2}{a^2}\right)^2}.$$

Recall, the Leak Criterion with Thread Shear 425 described above:

$$\sqrt{\left(\sqrt{3}\Delta p\left(\frac{c^2}{c^2-a^2}\right)\left(\frac{a^2}{b^2}\right)\right)^2 + (\Delta\sigma_z)^2 + 3\tau^2} + \frac{\alpha}{3}\Delta\sigma_z = -\alpha\sigma_n + \beta.$$

Using the pressure-test constants ($K_0$, $K_1$, $K_2$, and $K_3$), the Leak Criterion with Thread Shear 425 for internal leak at the inner radius (a) reduces to:

$$P_a \frac{2a^2}{c^2 - a^2}\left[K_3 + \frac{\alpha}{3}\right] = \beta$$

and the Leak Criterion with Thread Shear 425 for external leak at the outer radius (c) reduces to:

$$P_c \frac{2c^2}{c^2 - a^2}\left[K_1 - K_2\frac{\alpha}{3}\right] = \beta.$$

Whereas a uniaxial asymmetry ratio (m) was applied above for the uniaxial force test, a unilateral asymmetry ratio (n) may be applied here for the pressure-test conditions, where $n = (a^2 P_a)/(c^2 P_c)$.

Using the unilateral asymmetry ratio (n), the above equations can be solved for alpha and beta:

$$\alpha = 3\frac{K_1 - K_3 n}{K_2 + n}$$

$$\beta = 2P_a \frac{a^2}{c^2 - a^2}\left(\frac{K_1 + K_2 K_3}{K_2 + n}\right) \text{ or } \beta = 2P_c \frac{c^2 n}{c^2 - a^2}\left(\frac{K_1 + K_2 K_3}{K_2 + n}\right).$$

For the example LTC connection, the equation for Leak Criterion with Thread Shear 425 and the equations for alpha and beta (above) predict that internal leak will occur when the pressure (Pa) reaches 9,975 psi and that external leak will occur when the external leak pressure (Pc) reaches 10,770 psi. Using these predicted internal leak pressure (Pa) and the external leak pressure (Pc), along with the geometry data for the example LTC connection in the above equations, confirms that the Thread Modulus alpha ($\alpha$) equals 0.179 and the Makeup Leak Resistance beta ($\beta$) equals 35,720 psi.

Finite-element analysis (FEA) predicts that the example LTC connection will develop internal leak when the pressure (Pa) reaches 9,942 psi, which is close to the predicted value of 9,975 psi. The API internal leak value for the example LTC connection is 11,790 psi.

Figure 6:
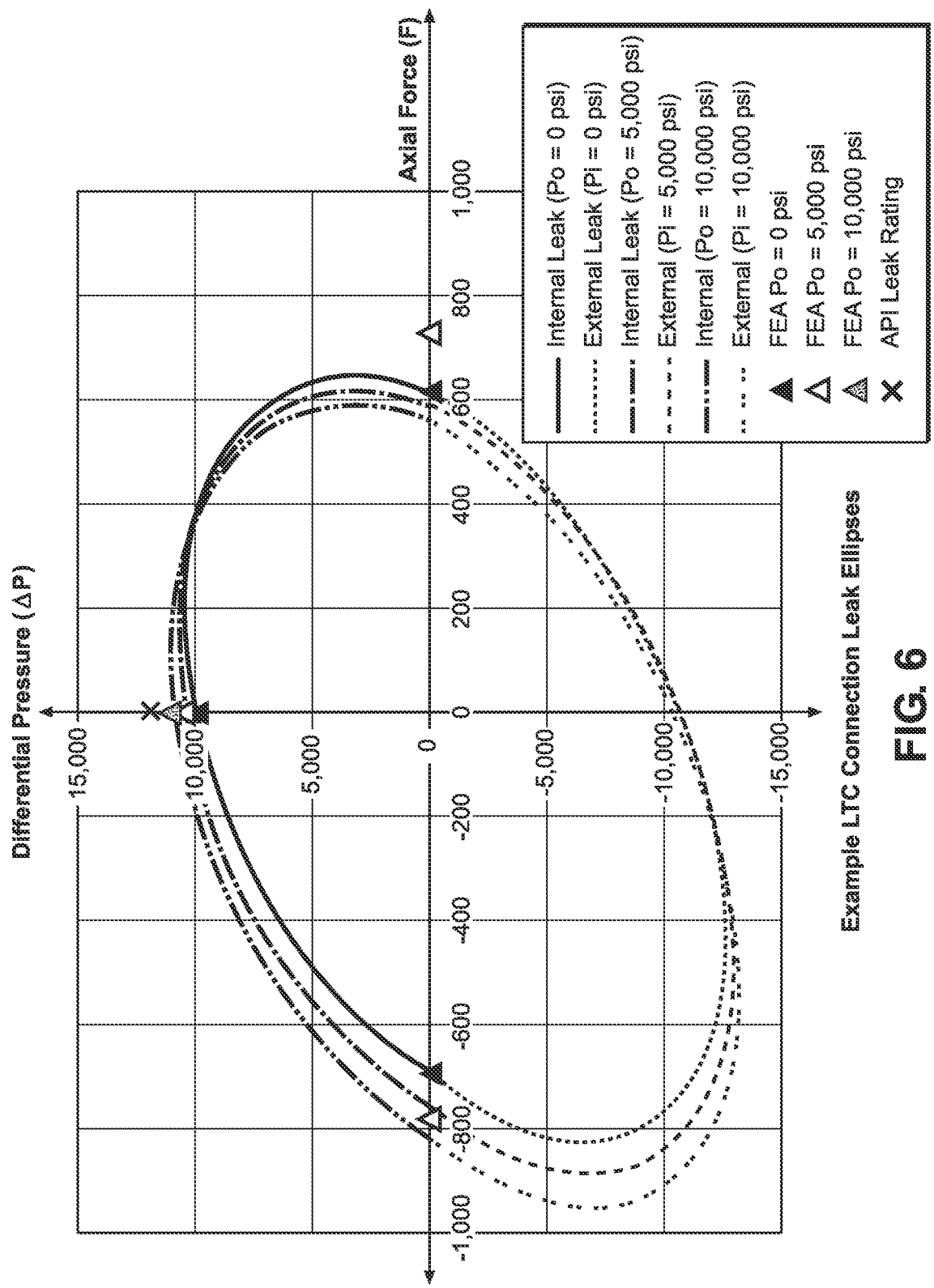
FIG. 6 is a graphical representation of the predicted leak conditions for an example API LTC connection.

FIG. 6 is a graphical representation of the predicted leak conditions for an example LTC connection. When plotted on a graph in which the abscissa value (along the x-axis) is the axial force (F) and the ordinate value (along the y-axis) is the differential pressure ($\Delta p = Pi - Po$), the predicted leak values form an ellipse.

As shown on the graph in FIG. 6, the solid X represents the API internal leak value of 11,790 psi for the example N80 connection when the axial force is zero (F=0).

The values for internal leak are plotted above the x-axis, where the differential pressure ($\Delta p$) is positive. The values for external leak are plotted below the x-axis, where the differential pressure ($\Delta p$) is negative. The transitions between the upper and lower halves of the ellipses are not smooth because the mean normal stress ($\sigma n$) is different for internal leak conditions versus external leak conditions. The triangles in FIG. 6 represent the values predicted by finite-element analysis (FEA).

The three ellipses plotted in FIG. 6 are based on the Leak Criterion with Thread Shear 425, using the alpha and beta values that were calculated using the formulas shown above.

The first ellipse is plotted using a solid line for internal leak (above the x-axis) and a dotted line for external leak (below the x-axis). As shown in the legend, the values for internal leak were calculated using an external pressure of zero (Po=0). The values for external leak were calculated using an internal pressure of zero (Pi=0). The solid triangles represent the values predicted by finite-element analysis (FEA) when the external pressure is zero (Po=0). As described above, FEA predicted that the LTC connection will open sufficiently to leak when the force in tension (T)=620 kips (e.g., a positive force (F) along the x-axis) or when the compression (C)=690 kips (e.g., a negative force). As shown, the first ellipse (solid line) crosses the positive y-axis very near the solid triangle. The first ellipse (dotted line) crosses the negative y-axis at minus 10,770 psi.

The second ellipse is plotted using a dashed line with a single dot for internal leak (above the x-axis) and a dashed line for external leak (below the x-axis). As shown in the legend, the values for internal leak were calculated using an external pressure of 5,000 psi. The values for external leak were calculated using an internal pressure of 5,000 psi. The open triangles represent the values predicted by finite-element analysis (FEA) when the external pressure is 5,000 psi. As shown, the open triangle for the compression limit (along the negative x-axis) is close to the value predicted (where the second ellipse crosses the x-axis). The open triangle for the tension limit (along the positive x-axis) is somewhat greater than the value predicted. The open triangle along the positive y-axis is close to the value predicted. The second ellipse (dashed line) crosses the negative y-axis at minus 10,630 psi.

The third ellipse is plotted using a dashed line with two dots for internal leak (above the x-axis) and a double-dotted line for external leak (below the x-axis). As shown in the legend, the values for internal leak were calculated using an external pressure of 10,000 psi. The values for external leak were calculated using an internal pressure of 10,000 psi. The shaded triangle represents the value predicted by finite-element analysis (FEA) when the external pressure is 10,000 psi. As shown, the shaded triangle along the positive y-axis is close to the value predicted. The third ellipse (double-dotted line) crosses the negative y-axis at minus 10,450 psi.

The three ellipses plotted in FIG. 6 are off-center, as expected, because of hydrostatic pressure. As backup pressure increases, the ellipse shifts to the left and the difference between the tension and compression limits increases (i.e., the curves are further apart) because of the ($\alpha P$) term in the Triaxial Leak Criterion 25:

$$\sigma_{VM} = -\alpha P + \beta.$$

Figure 7:
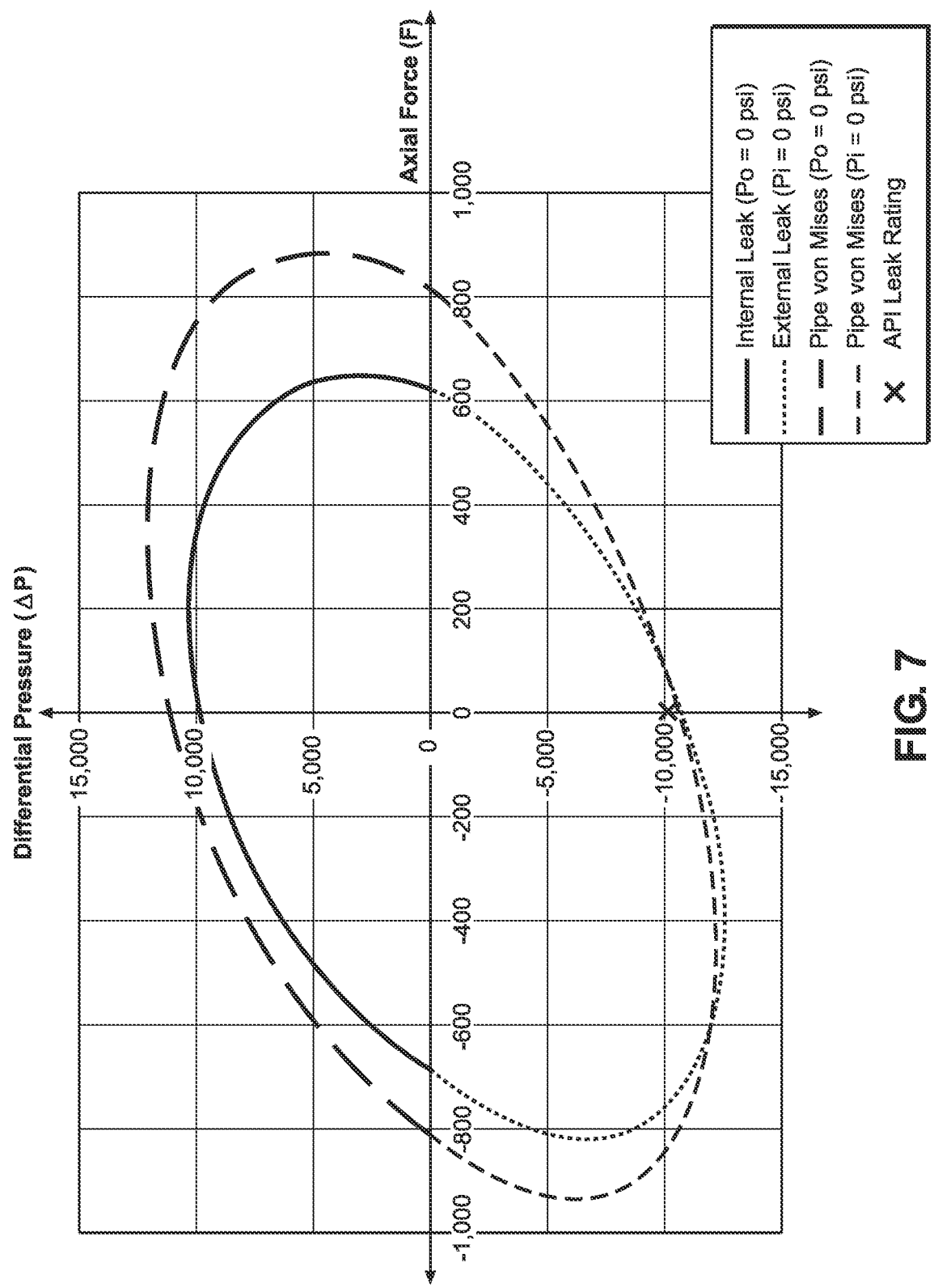
FIG. 7 is a graphical representation of the predicted failure conditions for a pipe-body alone and for the example API LTC connection.

FIG. 7 is a graphical representation of the predicted failure conditions for the pipe-body alone (steel yield strength (Y) for the outer ellipse, shown using dashed lines) and for the connection alone (leak for the inner ellipse, shown using solid and dotted lines) for the example LTC connection. The abscissa values (along the x-axis) represent the axial force (F) and the ordinate values (along the y-axis) represent the differential pressure ($\Delta p = Pi - Po$).

For the pipe-body (the outer ellipse), the Von Mises equation is used with the yield strength (Y) of the N80 pipe material (Y=80,000 psi). For $\Delta p=0$, the pipe ellipse shows that both the compressive and tensile limits are the same, namely 814 kips (based on Y times the cross-sectional area of the example pipe body). Loads inside the pipe ellipse indicate that the pipe is safe.

For the connection (the inner ellipse), the Leak Criterion with Thread Shear 425 is used to calculate the values on the ellipse. The inner ellipse for the connection is mostly inside the outer pipe-body ellipse, which indicates the connection will leak before the pipe body fails.

For evaluating leak, predicted values inside the inner ellipse indicate a safe connection, whereas values outside the leak ellipse indicate the connection will fail.

The inner ellipse for the connection is mostly inside the outer pipe-body ellipse, except for a small section in quadrant three. The two ellipses cross near the API collapse limit (shown by the X), suggesting that the pipe-body will collapse before external leak occurs.

Although the various embodiments are described with reference to petroleum engineering and down-the-hole drilling and production for oil and gas, the methods and systems described herein may be applied in a variety of contexts. For example, the technology and solutions described herein may be readily applied to any use or application that includes a column (vertical, horizontal, or otherwise) of elements having one or more threaded connections, especially when such a column is positioned within any substance that may be characterized as a fluid or causing fluid-like pressures on the column, such as from cement, soil, and rock or generally from any solid that squeezes or confines the column.

Figure 8:
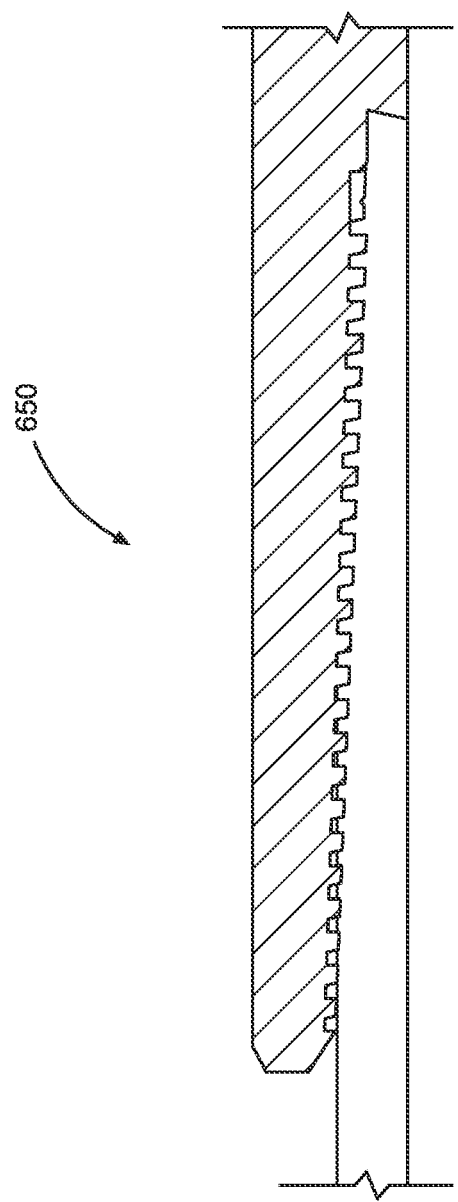
FIG. 8 is a partial cross-sectional view of an example generic premium connection.

Quadratic Leak Criterion for an Example Generic Premium Connection: FIG. 8 is a partial cross-sectional view of an example generic, premium threaded connection 650 which has been slightly modified to leak in tension before the pipe body fails. The connection 650 selected for analysis herein is a generic premium connection; a 9-⅝-inch 40-ppf N80 coupled casing connection with an internal metal-to-metal seal, buttress-type threads, and a torque shoulder. The connection 650 was modified for use with finite element analysis (FEA) to determine the leak constants (e.g., the thread modulus ($\alpha$) and the makeup leak resistance ($\beta$)) as described herein. For example, the connection 650 was modified to have a reduced seal contact at make-up so the connection 650 would leak under moderate to high loads before pipe yield (i.e., the pipe body von Mises stress is within the yield limit). Otherwise, the pipe body would yield before the connection leaks.

For conducting a finite element analysis (FEA) of the example premium connection 650, the N80 casing material was modeled using a bilinear stress-strain relationship with an ultimate tensile strength of 100 ksi at 10% strain. An elastic modulus of 30,000 ksi and a Poisson's ratio of 0.3 were used. Contact interaction was modeled between the pin and the box. Friction was not considered at the contact interface. An axial symmetry boundary condition was applied at the coupling center, where the boundary was fixed along the longitudinal direction but was allowed to move radially. Pressure access was assumed; internal pressure was applied on the pin-shoulder interface to the seal, and external pressure was applied in the thread region to the seal.

A finite element analysis (FEA) of the example connection 650 evaluated eleven (11) load cases that would result in leaks. The leaking test cases 700A are tabulated in FIG. 9 including the combination of loads (e.g., pressures and forces) which, based on the FEA, would be expected to result in leak of the example connection 650. The FEA predicted the tensile forces (F) which, given the pressures, would produce leaks at the connection 650. For example, for leaking test case 1 in FIG. 9, the FEA predicted that a tensile force (F) equal to 621 kips (tension is positive and compression is negative) would produce a leak. The test cases 700A can be actual, physical tests conducted in a laboratory which leak or FEA tests that predict leak. In either case, the tests are designed such that the connection leaks before the pipe-end of the test specimen fails.

FIG. 9 also includes a number of calculated values associated with each leaking test case 700A. For example, each differential pressure value ($\Delta p$) (=Pi−Po) 910 is calculated by subtracting the external pressure (Po) from the internal pressure (Pi). The normal stresses (radial, hoop, axial), the shear stress (tau), the Lubinski neutral stress ($\sigma n$), and each von Mises stress value ($\sigma_{VM}$) 930 were calculated using the equations discussed herein. The mean normal stress (P) is calculated as the average of the three normal stresses, as described herein.

FIG. 9 also includes an effective pressure value (Pe) 920 associated with each leaking test case 700A. The value for each effective pressure (Pe) (=P−$\sigma n$) is calculated by subtracting the neutral stress ($\sigma n$) from the mean normal stress (P). For example, leaking test case 5 has a mean normal stress (P) equal to −2.523 and a neutral stress ($\sigma n$) of −10. The effective pressure (Pe) for leaking test case 5 equals P (−2.523) minus $\sigma n$ (−10), which equals +7.477.

Figure 10:
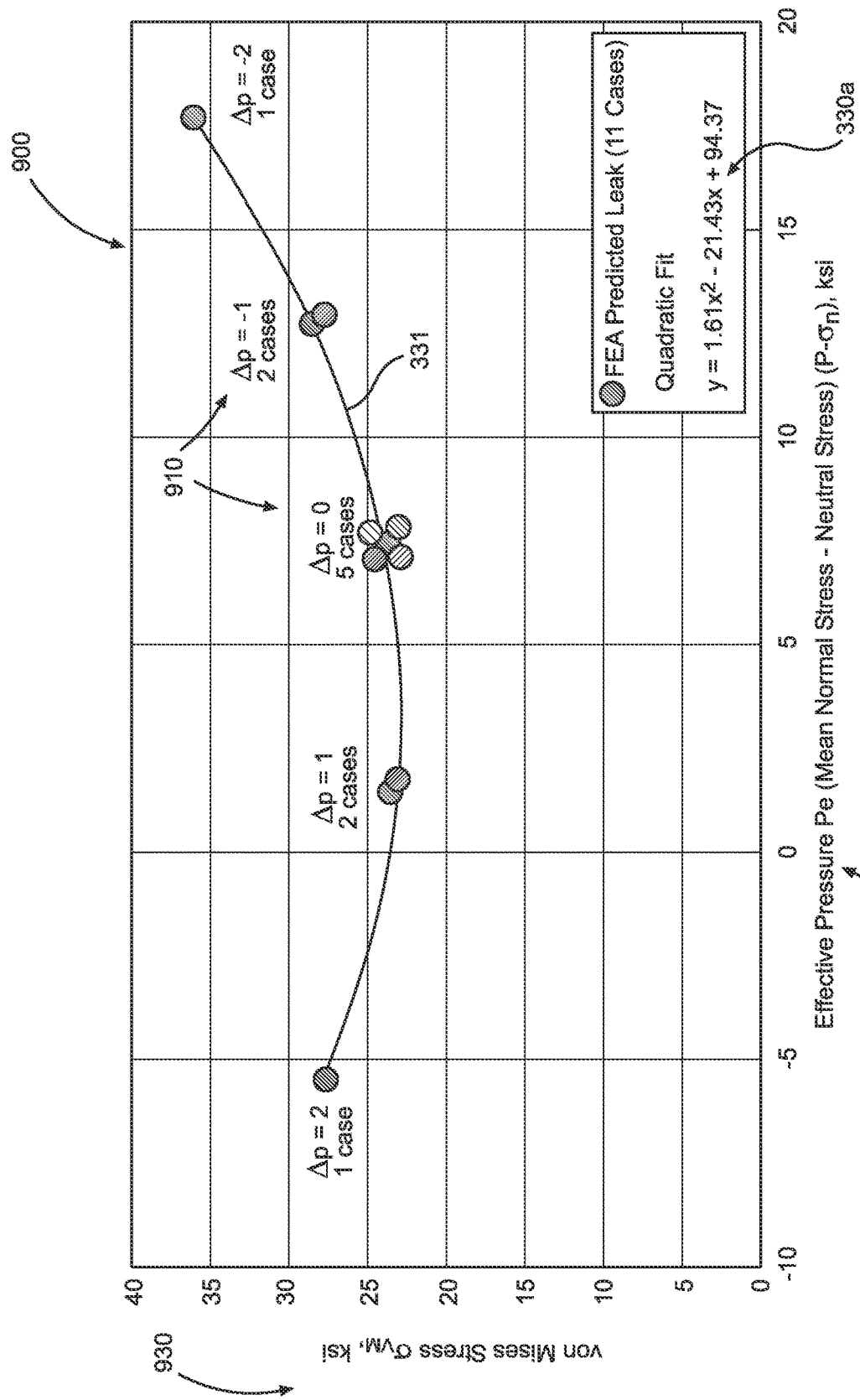
FIG. 10 is a graph of the leaking test cases from FIG. 9 and a quadratic expression fitted to the values.

FIG. 10 is a graph 900 of the leaking test cases 700A tabulated in FIG. 9. As shown, the graph 900 in FIG. 10 is a Cartesian coordinate system in which each abscissa value along the x-axis is an effective pressure 920 (Pe) (=P−$\sigma n$) and each ordinate value along the y-axis is a von Mises stress 930. As shown, the plotted data values associated with each particular differential pressure (e.g., $\Delta p=2$, $\Delta p=1$, $\Delta p=0$, $\Delta p=-1$, $\Delta p=-2$) are grouped together because they are nearly overlapping. For example, starting at the left side of the plotted values, a differential pressure of $\Delta p=2$ is associated with one case; specifically, leaking test case 8 in FIG. 9, in which the effective pressure Pe is 4.897 and the von Mises stress is 27.742.

The differential pressure of Δp=1 is associated with two cases; specifically, leaking test cases 6 and 7 in FIG. 9. Note, the plotted values associated with the two cases of Δp=1 are nearly overlapping.

The differential pressure of Δp=0 is associated with five cases; specifically, leaking test cases 1-5 in FIG. 9. Again, the plotted values associated with these five leaking test cases are nearly overlapping.

As shown in FIG. 10, the grouping of plotted values associated with the eleven leaking test cases 700A has a quadratic dependence on effective pressure (Pe) (=P−σn) with three constants. Curve fitting refers to the process of constructing a curve or a mathematical function that best fits a series of data points. In most types of curve fitting, the data are fitted using a number of successive approximations. Linear or straight-line fitting is a common form in which the mathematical model is a linear expression (e.g., y=mx+b). When the data points indicate a quadratic dependence, such as those shown in FIG. 10, the mathematical model is a quadratic expression (e.g., y=ax²+bx+c) that most closely fits the data.

The leak behavior of a threaded connection as a function of effective pressure (Pe) (=P−σn) is described by a new quadratic leak criterion 325:

$$\sigma_{VM} = \delta P_e^2 - \alpha P_e + \beta$$

where the first constant is called the leak path factor (δ) and the other two constants are the thread modulus (α) and the makeup leak resistance (β), as described herein. The first constant is called the leak path factor (δ) because it appears to depend on the leak flow path and the differential pressure (Δp) or, more specifically, on internal leak versus external leak.

The three leak constants will be different for different connections. Because thread modulus (α) and leak path factor (δ) are multipliers of the load terms, these two constants in some cases may depend on connection type instead of size; so those constants may be the same for a family of connections having the same type. The makeup leak resistance (β) will be different for different sizes, but it may correlate with one or more geometric parameters for the same family of connections.

For the example leaking test cases 700A tabulated in FIG. 9 and shown on the graph 900 in FIG. 10, the fitting quadratic expression 330a has a leak path factor (δ) equal to 1.61 psi⁻¹, a unitless thread modulus (α) of 21.43 and a makeup leak resistance (β) of 94.37 psi. The fitting quadratic expression 330a, as shown, produces a parabola 331 that approximately fits the plotted data points.

Any of a variety of curve fitting models and tools may be used to perform the process of fitting a quadratic expression to the data points. For example, applications with graphical tools, such as Microsoft Excel, may include one or more fitting models (e.g., exponential, linear, logarithmic, polynomial, and the like) for analyzing sets of data points. In some implementations, the method of fitting includes plotting the data points on a graph, as shown in FIG. 10.

The quadratic leak criterion 325 can also be expressed, of course, as a leak safety factor 330, according to the equation:

$$SF_{Leak} = \frac{\delta P_e^2 - \alpha P_e + \beta}{\sigma_{VM}}$$

in which the numerator represents the working stress limit and the denominator represents the working stress. In practice, as described herein, a designer can approve a threaded connection (for the anticipated loads) if the leak safety factor is greater than a threshold value, which is typically a number equal to or greater than one. An additional 'design factor' may be selected by the designer (or imposed by an operator) as an additional margin of safety, in order to account for manufacturing tolerances and the like. For example, a designer or operator may specify a value of 1.25 or greater for the threshold value.

Figure 11:
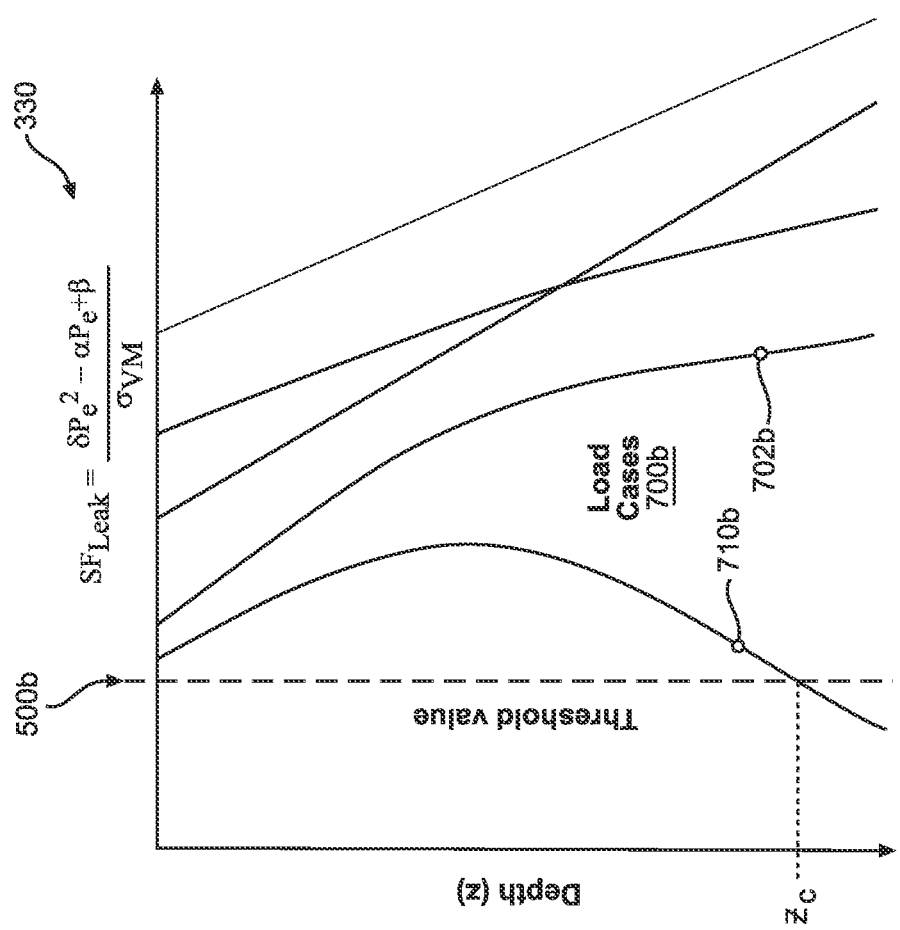
FIG. 11 is a graphical representation of a quadratic leak safety factor for an example string, including example load case lines for a number of example load cases.

FIG. 11 is a graphical representation of a quadratic leak safety factor 330 for an example string of threaded connections, including example load case lines for a number of example load cases 700b. The quadratic leak safety factor for each string is plotted on the x-axis, versus depth (z) on the y-axis, for each example string. Each string will have its own leak safety plot. The graph includes a line representing the threshold value 500b. For each of the example load cases 700b, the value of the leak safety factor can be calculated for each depth (z) along the string and plotted.

Five different load case lines are shown. The closer the line is to the threshold value 500b, the higher the leak risk. The load case lines provide a visual representation of the relative leak risk, which may include load cases that do not meet the threshold value 500b for leak safety. For example, the load case line 710b crosses the line representing the threshold value 500b, indicating a high risk of leak. The leak safety plot also displays the depth at which leak is expected to occur for a load case. Load case line 710b, for example, is expected to leak at or near a critical depth (zc).

The load case lines also provide a visual representation of the leak risk relative to other load cases. For example, load case line 702b indicates a higher safety factor compared to load case line 710b (at all depths). In this aspect, this kind of graph may be used for a visual assessment of a plurality of load cases 700b.

As used herein, the term "optimize" refers to and includes selecting a threaded connection that will withstand the assumed loads in the well planning or design phase. In addition, the term "optimize" also refers to and includes the management or adjustment of the loads (e.g., pressures and forces), during the operation phase, to ensure safety and to maintain connection integrity. For example, a threaded connection may have been selected, delivered, or installed. The methods and systems described herein may be applied to optimize the operation of the connection by changing or adjusting the loads that will be acting on a connection.

Integrity Safety Factor for Tubular Connections Based on Three Simple Laboratory Tests: An example connection selected for analysis herein is an API LTC (long thread casing) connection; namely, a 7-inch 35-ppf N80 LTC. A finite element analysis (FEA) of this example connection evaluated twenty-three (23) load cases that would result in leaks. The leaking load cases 1200 are tabulated in FIG. 12. The data includes the combination of loads (e.g., fluid pressures and axial forces) which, based on the FEA, would be expected to result in leak of the example connection. These twenty-three load cases cover the full range of $P_i$, $P_o$, and F for leak, including leak under equal non-zero pressure $P_i = P_o$ which increases the hydrostatic effect resulting in a greater force (F) required for leak.

Given two of the three loads (Pi, Po, F), the FEA predicted the third load which would produce leak at the connection. For example, the FEA for leaking load case 1 predicted that a tensile force (F) equal to 653 kips would produce a leak.

The FEA for leaking load case 7 predicted that a compressive force (F) equal to 755 kips would produce a leak. The load cases 1200 can be actual, physical tests conducted in a laboratory which leak or FEA tests that predict leak. In either case, the tests are designed such that the connection leaks before the pipe-end of the test specimen fails.

Figure 12:
FIG. 12 is a table of values associated with a plurality of example load cases for an example API LTC connection.

FIG. 12 also includes a number of calculated values associated with each load case 1200. For example, each differential pressure value (Δp=Pi–Po) 1210 is calculated by subtracting the external pressure (Po) from the internal pressure (Pi). The normal stresses (radial, hoop, axial), the shear stress (tau), the Lubinski neutral stress (σn), and each von Mises stress value ($\sigma_{VM}$) 1230 were calculated using the equations discussed herein. The mean normal stress (P) is calculated as the average of the three normal stresses, as described herein.

Leak in the example connection can be predicted with the FEA using flank contact stress intensity and two leak thresholds: one for flank sealing and one for thread dope sealing. Contact stress intensity is the contact stress integrated over the flank length and is considered a better measure of sealability than contact stress alone (which has stress spikes and varies significantly). A flank loses seal when the stress intensity falls below a threshold determined from a formula with linear dependence on the fluid pressure. Thread dope fails to plug the helical leak path of the root-crest clearance when a certain number of flanks (i.e., the dope threshold) are non-sealing, which shortens the leak path.

Yielding can be analyzed to help distinguish and explain the different behavior between internal and external leak. At make-up, significant shear occurs because the shrink-fit pressure at the pin-box interface creates a Poisson effect that shortens the box and elongates the pin. This shear and hoop stress in the pin generate a von Mises stress that is close to yield. Internal pressure $P_i$ creates an offsetting hoop stress and lowers the tendency for local yielding in the pin, but external pressure $P_o$ does the opposite and aggravates yield in the pin. Also, axial tension is problematic for yield, but compression is not; this behavior is magnified with increasing pressures because the hydrostatic effect requires more axial load for leak. In effect, the connection can experience two types of leak: "leak before yield" for internal leak or pure compression, versus "yield before leak" for external leak or pure tension. For the examples described herein, instead of distinguishing leak based on yield, the focus is on whether the differential pressure Dp is positive, negative, or zero.

The load cases in FIG. 12 for which the differential pressure Dp=0 are worth noting because leak cannot technically occur when $P_i=P_o$. For the examples described herein, in the context of leak, it is assumed that a differential pressure of zero (Dp=0) means that leak can occur at a very low Dp.

FIG. 12 includes data from the two uniaxial cases—uniaxial tension (load case 1) and uniaxial compression (load case 7). The FEA for load case 1 predicted that a tensile force (F) equal to 653 kips would produce a leak. The FEA for leaking load case 7 predicted that a compressive force (F) equal to 755 kips would produce a leak. The uniaxial cases can be evaluated using simple lab tests, which are relatively safe because high pressure is not required. Testing the uniaxial cases are also relatively less expensive because those require a simple bladder and a sight-tube, instead of high-pressure end caps. Interestingly, the tests with a differential pressure of zero (Dp=0) produced higher $s_{VM}$ values.

FIG. 12 also includes an effective pressure value (Pe) 1220 associated with each load case 1200. The value for each effective pressure (Pe) (=P–σn) is calculated by subtracting the neutral stress (σn) from the mean normal stress (P). For example, load case 2 has a mean normal stress (P) equal to 14.96 and a neutral stress (σn) of 10.18. The effective pressure (Pe) for load case 2 equals P (14.96) minus σn (10.18), which equals 4.70, as shown. The effective pressure $P_e$ is related to the effective stress ($s_z$–$s_n$):

$$P_e = P - \sigma_n = \frac{\sigma_z - \sigma_n}{3} = \frac{\sigma_z - P}{2}$$

This equation provides a physical interpretation of effective stress and fictitious force. ($s_z$–P) represents the deviatoric axial stress. Deviatoric stress is the total stress minus the hydrostatic pressure P, so it represents pure shear. By definition, the von Mises stress is determined from the deviatoric stress; therefore, yield is governed by pure shear. Effective stress controls buckling. The equation above shows that buckling is independent of hydrostatic pressure P; therefore, buckling is also governed by pure shear.

The leak behavior of a threaded connection as a function of effective pressure (Pe) (=P–σn) is described by the quadratic leak criterion 325 that includes three leak constants:

$$\sigma_{VM} = \delta P_e^2 - \alpha P_e + \beta$$

The first constant is called the leak path factor (δ) and the other two constants are the thread modulus (α) and the makeup leak resistance (β), as described herein. The first constant is called the leak path factor (δ) because it appears to depend on the leak flow path and the differential pressure (Δp). The leak path factor (δ) is useful for modeling both internal leak and external leak.

Figure 13:
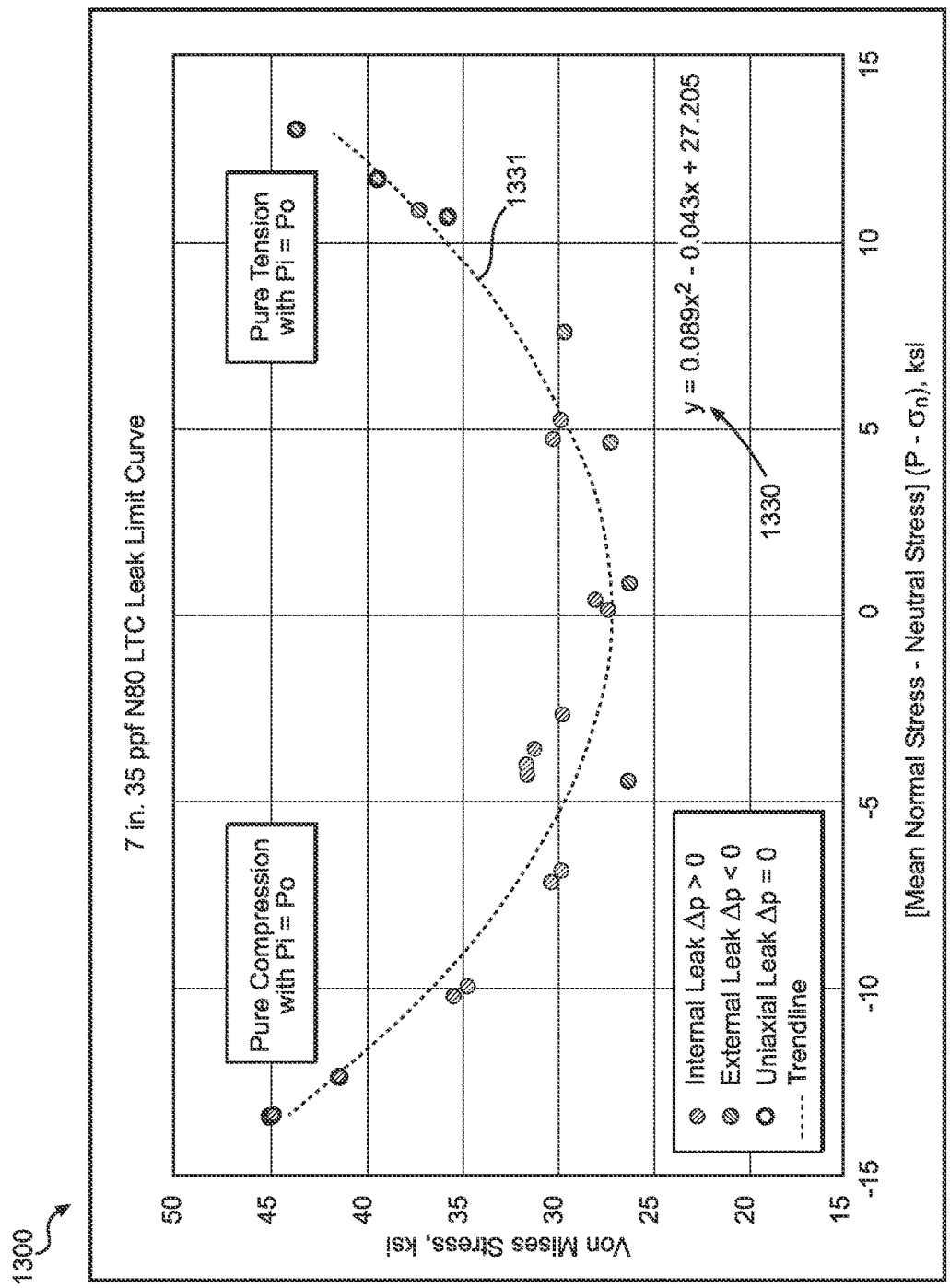
FIG. 13 is a graph of the load cases from FIG. 12 and a quadratic expression fitted to the values.

FIG. 13 is a graph 1300 of the load cases 1200 tabulated in FIG. 12, with the values for (P–$s_n$) plotted on the x-axis and the values for the von Mises stress ($s_{VM}$) on the y-axis. For the load cases 1200 shown on the graph 1300, the fitting quadratic expression 1330 has a leak path factor (δ) equal to 0.089 $\text{psi}^{-1}$, a unitless thread modulus (α) of 0.043 and a makeup leak resistance (β) of 27.205 psi. The fitting quadratic expression 1330, as shown, produces a parabola 1331 that approximately fits the plotted data points.

Any of a variety of curve fitting models and tools may be used to perform the process of fitting a quadratic expression to the data points. For example, applications with graphical tools, such as Microsoft Excel, may include one or more fitting models (e.g., exponential, linear, logarithmic, polynomial, and the like) for analyzing sets of data points. In some implementations, the method of fitting includes plotting the data points on a graph, as shown in FIG. 13.

As shown on FIG. 13, most of the external leak cases are to the right side of the graph (i.e., where Pe>0). Most of the internal leak cases are to the left (where Pe<0).

Load case 3 in FIG. 13 is nearest to the central vertical line on the graph (where Pe=0), which would occur for a closed-end test with an applied force of zero (F=0). Load case 3 consists of internal pressure with zero external pressure and tension nearly equal to the force on an end-cap if one were present.

Load cases 1 and 7 are uniaxial tension and uniaxial compression, respectively, and occur near the ends of the leak envelope. Axial force with equal non-zero pressures push leak further to the ends. Load case 12, 13, and 14 are in tension, with increasing values for surrounding pressure. Load cases 15 and 16 are in compression, with increased pressures.

The pure F cases with Dp=0 have the largest $s_{VM}$ values and the cases closest to $P_e=0$ have the smallest $s_{VM}$ values.

The groupings of load cases together suggest common features. For example, load cases 6 and 23 have the same F and nearly the same Dp. Similarly, load cases 5 and 22 have the same F and nearly the same Dp. Load cases 4, 17, 18, and 19 have F=0 and nearly the same Dp.

Figure 14:
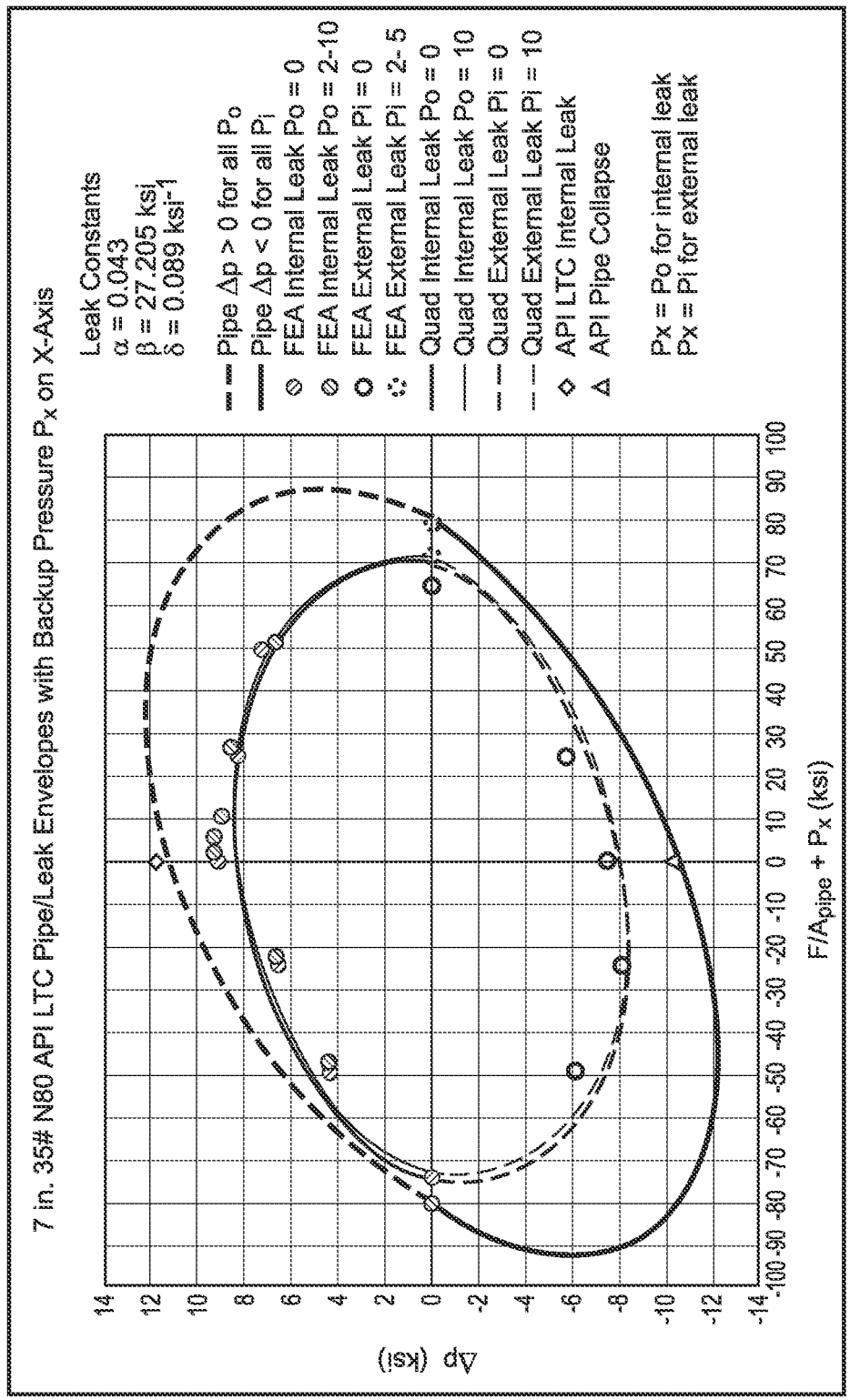
FIG. 14 is a graphical representation of the leak envelope using the load cases from FIG. 12 superimposed on a pipe ellipse.

FIG. 14 is a conventional ellipse plot with Dp on the y-axis and force (F) included on the x-axis, given the three leak constants from the fitting quadratic expression 1330, as shown in FIG. 13. The solution of the quadratic leak criterion 325 below in terms of Pi, Po, and F involves a quartic equation with four real roots. The results are plotted in FIG. 14.

$$\sigma_{VM} = \delta P_e^2 - \alpha P_e + \beta$$

In FIG. 14, the x-axis is similar to the x-axis in the API pipe collapse rating plots; namely $(s_z+P_i)$—because $s_z$ for the pipe equals the force (F) divided by the cross-sectional area of the pipe. The yield ellipse for the pipe with x-axis as $(s_z+P_x)$ is valid for both burst and collapse. The pipe ellipse applies to any backup pressure $P_x$ because the von Mises yield criterion is independent of hydrostatic pressure P. Hydrostatic independence of yield is also the reason that the pipe tension rating and compression rating are equal. The pipe ellipse is the largest ellipse in FIG. 14 and it crosses the x-axis at 80 ksi for both positive and negative axial loads.

Hydrostatic independence is not a characteristic of connection leak behavior, as demonstrated by the different uniaxial leak ratings, as shown in FIG. 14. For example, the connections are stronger against leak in compression. The two inner leak ellipses are for backup pressures of zero and 10 ksi, respectively. However, as shown in FIG. 14, the differences between these two inner ellipses is not large; and the difference depends on the axial force, as expected because $s_n$ is subtracted from P. The difference is essentially negligible for small forces (F) where the two ellipses nearly overlay each other. The leak and pipe envelopes can be used to plot operational loads for the purpose of determining if the operational loads are potentially problematic for well integrity.

Also, as shown in FIG. 14, the upper curves (for Dp>0) and the lower curves (for Dp<0) are slightly different in shape because the equations are different.

The API limits for connection leak and pipe collapse are shown in FIG. 14. The ellipses in FIG. 14 demonstrate that the API ratings for this example LTC connection are not conservative. The FEA predicted leak data and the triaxial leak envelopes demonstrate that leak occurs before the pipe fails. Predicting leak before pipe failure is important for well integrity because, among other reasons, well design typically assumes that the connections are as strong as the pipe. If the connections are expected to fail first (i.e., before the pipe itself fails), then the 3 Ms (measure, monitor, and maintain) become an important activity both for connections and for overall well integrity. The operating conditions (e.g., $P_i$, $P_o$, and F) are either known or can be reasonably estimated during well operations. Using the known operating conditions, the sealability can be measured and monitored using a new integrity safety factor for the connection ($ISF_{CON}$) 1500 as described herein.

To evaluate the possibility that a casing may yield and fail, the von Mises stress $s_{VM}$ must be calculated along the casing and tracked during operations. In general, an integrity safety factor for the casing may be expressed as the ratio of Resistance to Load, where the Resistance is specified as the "maximum $s_{VM}$ allowed" divided by the Load, which is the "actual casing stress $s_{VM}$ based on the operating conditions, $P_i$, $P_o$, and F." The max-$s_{VM}$ is sometimes referred to as the Grade, which can vary along the casing because Grade is temperature dependent. The Casing Grade and ID/OD (inner diameter, outer diameter) were selected during the planning stage and are fixed during operations. The operating loads ($P_i$, $P_o$, F) will vary during operations but can be estimated, and therefore the actual $s_{VM}$ can be calculated at any time at any location along the casing based on the loads and ID/OD. In this aspect, an integrity safety factor for the casing can expressed as the ratio of Grade to Actual-$s_{VM}$. If the integrity safety factor for the casing falls below a specified integrity threshold, then the operator can respond and adjust operations (e.g., make changes to flow rates, temperatures, drilling speed, and the like, which are expected to cause a change in the operating loads, $P_i$, $P_o$, F) and thereby maintain connection integrity.

Connection ISF (Integrity Safety Factor)

The new integrity safety factor for a connection ($ISF_{CON}$) 1500 provides a method of evaluating the well integrity during actual operation conditions, according to the expression:

$$ISF_{con} = \frac{\delta P_e^2 - \alpha P_e + \beta}{\sigma_{VM}}$$

The maximum von Mises stress ($s_{VM}$) is determined using the quadratic leak criterion 325:

$$\sigma_{VM} = \delta P_e^2 - \alpha P_e + \beta$$

The actual von Mises stress ($s_{VM}$) is calculated from the stress equations described herein.

The three leak constants can be measured using laboratory tests. In some implementations, the leak constants are measured according to three laboratory test conditions: uniaxial tension, uniaxial compression, and a capped end with Pi only. Under the uniaxial tension test condition, the internal and external pressures are zero ($P_i=P_o=0$) and leak occurs when $F=T_L$, where $T_L$ is the tensile force sufficient to cause leak. Under the uniaxial compression test condition, the internal and external pressures are zero ($P_i=P_o=0$) and leak occurs when $F=-C_L$ where $C_L$ is the compressive force sufficient to cause leak. The capped-end test condition is characterized by an external pressure equal to zero ($P_o=0$) and an internal pressure at which leak occurs ($P_i=P_{iL}$). With no externally applied axial tension or compression, the only applied axial load is the axial force on the end cap due to internal pressure, so $F=A_i P_{iL}$ where $A_i=\pi a^2$.

The starting point for calculating the three constants is the quadratic leak criterion 325, expressed in terms of loads, as follows:

$$\sqrt{\left(\sqrt{3}\Delta P \frac{c^2}{c^2-a^2}\frac{a^2}{b^2}\right)^2 + (\sigma_z - \sigma_n)^2 + 3\tau^2} = \delta P_e^2 - \alpha P_e + \beta$$

For the capped-end test condition, using the equations for stress described herein, the neutral stress $s_n = A_i P_{iL}/A_{con}$ and the effective pressure $Pe=(s_z-s_n)/3=0$. Using the equations described herein and denoting $A_o = \pi c^2$ and $A_b = \pi b^2$, the equation above defines the makeup leak resistance ($\beta$) as:

$$\beta = P_{iL}\sqrt{3\left(\frac{A_i A_o}{A_b A_{con}}\right)^2 + 3\left(\frac{A_i + A_{pin}}{A_t}\right)^2}$$

For the uniaxial tension test condition, $Dp = s_n = 0$, $s_{zT} = T_L/A_{con}$, $t_T = T_L/A_t$, and $P_{eT} = T_L/(3A_{con})$. Defining a geometric quantity S as:

$$S = \sqrt{1 + 3\left(\frac{A_{con}}{A_t}\right)^2}$$

the equation above defines the leak path factor ($\delta$) as:

$$\delta = 9\frac{\sigma_{zT}(S - \alpha/3) - \beta}{\sigma_{zT}^2}$$

Similarly, for the uniaxial compression test, with $Dp = s_n = 0$, $s_{zC} = -C_L/A_{con}$, $t_T = -C_L/A_t$, and $P_{eC} = -C_L/(3A_{con})$, then the leak path factor ($\delta$) is defined as:

$$\delta = 9\frac{\sigma_{zC}(S + \alpha/3) - \beta}{\sigma_{zC}^2}$$

The two equations above include two unknowns: the thread modulus (a) and the leak path factor ($\delta$). Solving for a and using the asymmetry ratio $m = T_L/C_L$, then $$\alpha = 3(1-m)\left(\frac{\beta}{\sigma_{zT}} - \frac{S}{1+m}\right) = 3(1-m)\left(\frac{\beta}{m\sigma_{zC}} - \frac{S}{1+m}\right)$$

The three laboratory test conditions produce known values for $T_L$, $C_L$, and $P_{iL}$. The equation above defines the makeup leak resistance ($\beta$). With a calculated value for the makeup leak resistance ($\beta$), the equations immediately above define the thread modulus (a). Either equation above can be used to calculate the leak path factor ($\delta$).

The equations for the three constants were applied using the uniaxial tension test condition and the uniaxial compression test condition. The uniaxial tension test condition should produce a value that is equal to the FEA value for load case 1 in FIG. 12, which predicted that a tensile force (F) equal to 653 kips would produce a leak. The uniaxial compression test condition should produce a value that is equal to the FEA value for load case 7 in FIG. 12, which predicted that a compressive force (F) equal to 755 kips would produce a leak. Using those two values along with $P_{iL} = 8.38$ ksi as determined from the equation above for the makeup leak resistance ($\beta$), the three leak constants calculated from the above equations are $a = 0.102$, $b = 27.205$ ksi, and $d = 0.084$ ksi$^{-1}$. Note, the value for the makeup leak resistance ($\beta$) represents the best fit of the data shown in FIG. 13, in which the fitting quadratic expression 1330 includes a makeup leak resistance ($\beta$) of 27.205 ksi.

Figure 15:
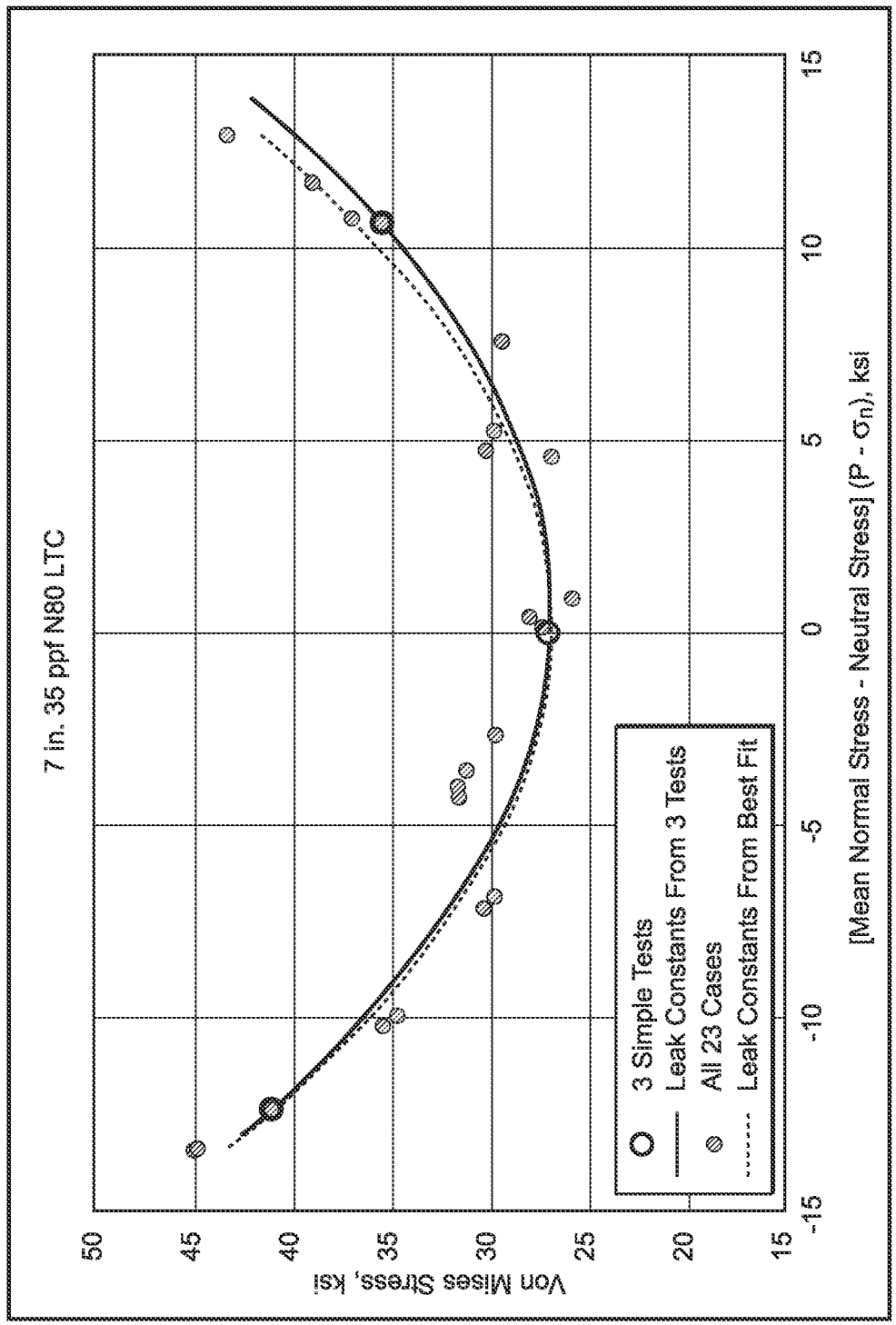
FIG. 15 is a graph of the stress values based on three constants from three test conditions compared to the stress values of the load cases from FIG. 12.

FIG. 15 shows a comparison of the leak constants based on the three test conditions, the twenty-three FEA values, and the best-fit of the data. As shown, the three-point parabola passes through all three data points, including the uniaxial compression point on the left side (e.g., the von Mises stress equal to 41.29 from load case 7 in FIG. 12), the makeup leak resistance ($\beta$) of 27.205 ksi in the center, and the uniaxial tension point on the right side (e.g., the von Mises stress equal to 35.71 from load case 1 in FIG. 12). The curve matches the data well and demonstrates that the three test conditions with pure loadings are sufficient to describe leak under any load combination, including backup pressure.

A new methodology is introduced to measure, monitor, and maintain well integrity of threaded connections with an ISF (integrity safety factor). The connection ISF equation 1300 is based on the quadratic leak criterion 325 in terms of von Mises stress and the effective pressure. If the integrity safety factor for a connection (ISF$_{CON}$) falls below a specified threshold, the operator can respond and adjust operations (e.g., make changes to flow rates, temperatures, drilling speed, and the like, which are expected to cause a change in the operating loads, $P_i$, $P_o$, F) to maintain connection integrity.

SAFE LOAD MANAGEMENT: In one aspect, the process of applying the integrity safety factor for a connection (ISF$_{CON}$) includes a method for determining the three leak constants that are associated with a particular threaded connection, using the test conditions and formulas described herein. The values for the three leak constants may be used to calculate the integrity safety factor for a connection (ISF$_{CON}$) during actual operating conditions. In a related aspect, the method includes changing one or more of the actual operating conditions (e.g., make changes to flow rates, temperatures, drilling speed, production parameters, event times, and the like). Making a change to the actual, current operating conditions is expected to cause a corresponding change in the future operating loads ($P_i$, $P_o$, F). As the operating loads change, the ISF$_{CON}$ will change. In this aspect, the process of calculating the ISF$_{CON}$ and adjusting the operating conditions becomes part of a program known as Safe Load Management, which includes an operational plan for well integrity. In some implementations, the integrity safety factor for a single connection (ISF$_{CON}$)—or for a set of one or more connections—can be used as the basis for evaluating the overall tubular integrity of the entire well for its full service life.

In some implementations, a well comprises a plurality of threaded connections and a load management computer. One of the main purposes of the load management computer is to measure, monitor, and maintain tubular integrity. The method includes building a computer model using the load management computer, wherein the computer model determines a set of current loads ($P_i$, $P_o$, F) at each location along each installed tubular for a set of current operating conditions. Using the load values, the load management computer performs a stress analysis and calculates the integrity safety factor associated with each of the plurality of threaded connections (ISF$_{CON}$) of the well. During operations, the load management computer monitors the calculated integrity safety factors and may detect an anomalous integrity safety factor that is less than a threshold value. In response, the load management computer.

Figure 16:
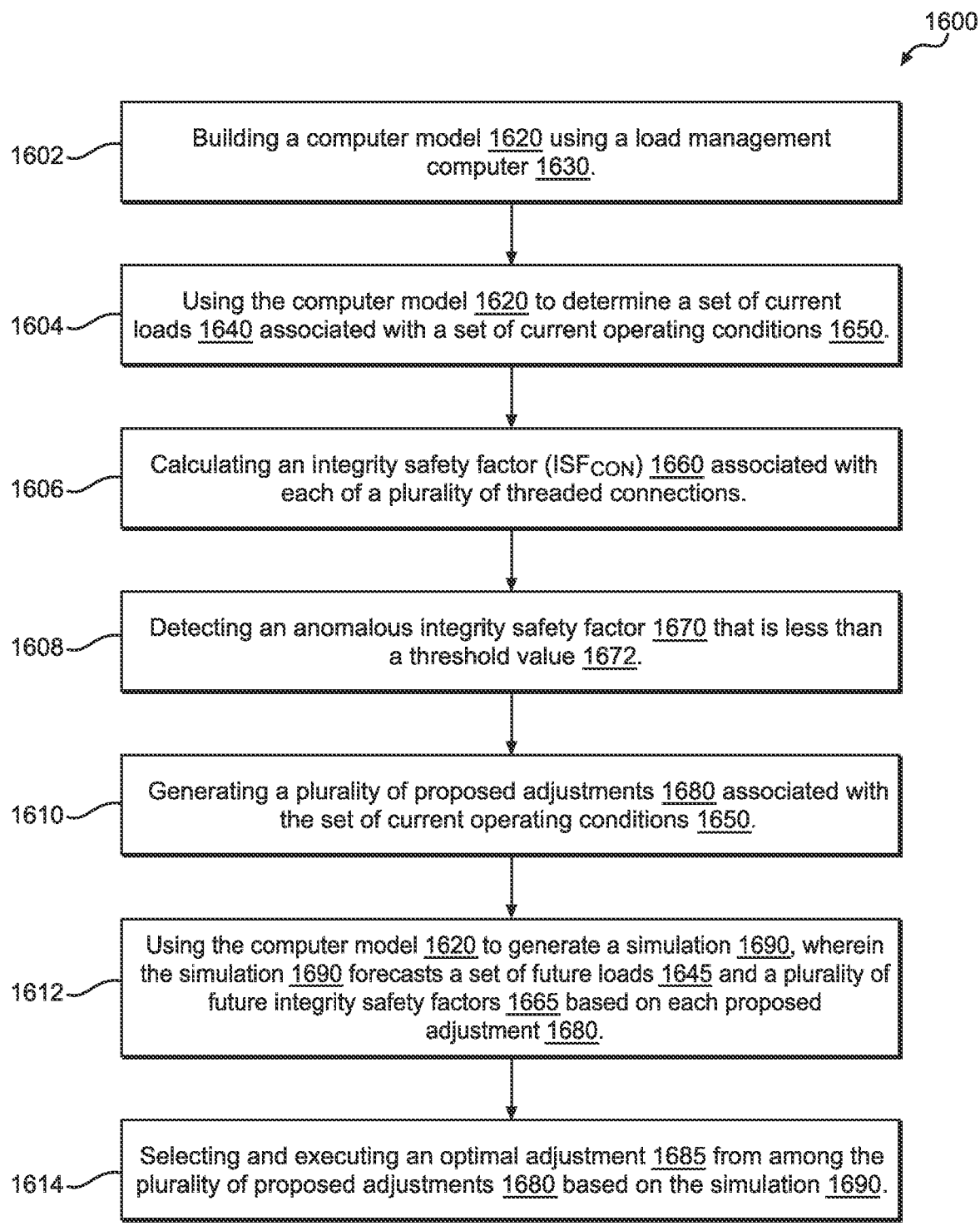
FIG. 16 is a flow chart listing the steps in an example method of using a load management computer to measure, monitor, and maintain tubular integrity.

FIG. 16 is a flow chart 1600 depicting an example method of using a load management computer 1630 to measure, monitor, and maintain tubular integrity. Although the steps are described with reference to the integrity safety factor (ISF$_{CON}$) described herein, other implementations of the steps described, for other values and parameters, will be understood by one of skill in the art from the description herein. For example, one may investigate operational integrity and cement integrity with their own associated ISF values, or one may optimize operations (e.g., cementing with knowledge of actual temperatures and pressures) even if the ISF values are safe. One or more of the steps shown and described in FIG. 16 may be performed simultaneously, in a series, in an order other than shown and described, or in conjunction with additional steps. Some steps may be omitted or, in some applications, repeated.

In some implementations, a well comprises a plurality of threaded connections and a load management computer 1630. Block 1602 describes an example step of building a computer model 1620 using the load management computer 1630. Block 1604 describes an example step of using the computer model 1620 to determine a set of current loads 1640 ($P_i$, $P_o$, F) which are associated with a set of current operating conditions 1650. Using the load values, the load management computer at block 1606 performs a stress analysis and calculates the integrity safety factor 1660 associated with each of the plurality of threaded connections ($ISF_{CON}$) of the well.

During operations, the load management computer 1630 monitors the calculated integrity safety factors 1660 and may detect an anomalous integrity safety factor 1670 (block 1608) that is less than a threshold value 1672. In response, the load management computer.

Block 1612 describes an example step of using the computer model 1620 to generate a simulation 1690. In some implementations, the simulation 1690 uses the computer model 1620 itself to look ahead, over time. The simulation 1690 forecasts a set of future loads 1645 and a plurality of future integrity safety factors 1665 ($ISF_{CON}$) based on each proposed adjustment 1680. Block 1614 describes an example step of selecting and executing an optimal adjustment 1685 from among the plurality of proposed adjustments 1680 based on the simulation 1690. The optimal adjustment 1685 in some implementations includes a plurality of optimal adjustments, to be executed simultaneously, sequentially, or in some other manner. The optimal adjustment(s) 1685 may be executed or otherwise implemented for the well in the field to maintain integrity. After executing the optimal adjustment(s) 1685, the example method steps in flow chart 1600 may be repeated as part of an ongoing safe load management system.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of determining one or more leak constants associated with a threaded connection, the method comprising:

(a) calculating a makeup leak resistance ($\beta$) associated with the threaded connection under a capped-end test condition, wherein the capped-end test condition is characterized by an external pressure (Po) equal to zero and an internal pressure at which leak occurs (PiL), according to the equation:

$$\beta = P_{iL}\sqrt{3\left(\frac{A_i A_o}{A_b A_{con}}\right)^2 + 3\left(\frac{A_i + A_{pin}}{A_t}\right)^2}$$

wherein the threaded connection is characterized by a pin, a box, an inner radius (a), a pin-box interface radius (b), and an outer radius (c), and wherein the makeup leak resistance ($\beta$) is a function of a cross-sectional area at the inner radius ($A_i$), a cross-sectional area at the outer radius ($A_o$), a cross-sectional area at the pin-box radius ($A_b$), a connection area ($A_{con}$), an exposed end area of the pin ($A_{pin}$), and an engaged thread area ($A_t$);

(b) calculating a thread modulus ($\alpha$) associated with the threaded connection according to the equation:

$$\alpha = 3(1-m)\left(\frac{\beta}{\sigma_{zT}} - \frac{S}{1+m}\right) = 3(1-m)\left(\frac{\beta}{m\sigma_{zC}} - \frac{S}{1+m}\right)$$

wherein an asymmetry ratio (m) is defined by a tension at which leak occurs ($T_L$) under a uniaxial tension test condition relative to a compression at which leak occurs ($C_L$) under a uniaxial compression test condition ($T_L/C_L$), wherein a geometric quantity(S) is defined by the equation, $$S = \sqrt{1 + 3\left(\frac{A_{con}}{A_t}\right)^2}$$

wherein a tensile stress ($\sigma_{zT}$) is defined as the tension at which leak occurs ($T_L$) divided by the connection area ($A_{con}$), and wherein a compressive stress ($\sigma_{zC}$) is defined as the compression at which leak occurs ($C_L$) divided by the connection area ($A_{con}$); and (c) calculating a leak path factor (δ) associated with the threaded connection under at least one of the uniaxial tension test condition or the uniaxial compression test condition, wherein the uniaxial tension test condition is characterized by an external pressure (Po) equal to zero, an internal pressure (Pi) equal to zero, wherein the tension at which leak occurs ($T_L$) is equal to a tensile force applied to the threaded connection, wherein the leak path factor (δ) is calculated according to the equation:

$$\delta = 9\frac{o_{zT}(S+\alpha/3) - \beta}{o_{zT}^2}$$

wherein the uniaxial compression test condition is characterized by an external pressure (Po) equal to zero, an internal pressure (Pi) equal to zero, wherein the compression at which leak occurs ($-C_L$) is equal to a compressive force applied to the threaded connection, and wherein the leak path factor (δ) is calculated according to the equation:

$$\delta = 9\frac{o_{zC}(S-\alpha/3) - \beta}{O_{zC}^2}$$

(d) calculating an integrity safety factor associated with a threaded connection ($ISF_{CON}$) under a set of current operating conditions, wherein the integrity safety factor is a function of an effective pressure (Pe) and a von Mises stress ($\sigma_{VM}$), according to the equation:

$$ISF_{CON} = \frac{\delta P_e^2 - \alpha P_e + \beta}{\sigma_{VM}}$$

wherein the effective pressure (Pe) and the von Mises stress ($\sigma_{VM}$) are determined based on actual well geometry and the set of current operating conditions, and wherein the effective pressure (Pe) is defined by a mean normal stress (P) minus a neutral axial stress (σn); and (e) for a well comprising a plurality of threaded connections, building a computer model using a load management computer, wherein the computer model determines a set of current loads associated with the set of current operating conditions;

calculating, using the load management computer, the integrity safety factor associated with each of the plurality of threaded connections ($ISF_{CON}$) based on the computer model;

detecting an anomalous calculated integrity safety factor that is less than a threshold value;

generating, using the load management computer, a plurality of proposed adjustments associated with the set of current operating conditions, wherein each proposed adjustment is tailored to change the set of current loads and thereby improve the anomalous calculated integrity safety factor;

using the computer model to generate a simulation, wherein the simulation forecasts a set of future loads and a plurality of future integrity safety factors ($ISF_{CON}$) based on each proposed adjustment; and executing an optimal adjustment selected from among the plurality of proposed adjustments based on the simulation.

2. The method of claim 1, further comprising:
changing one or more of the set of current operating conditions if the calculated integrity safety factor ($ISF_{CON}$) is less than a threshold value.

3. The method of claim 1, further comprising:
evaluating the overall integrity of the well based on the calculated integrity safety factor ($ISF_{CON}$).

4. The method of claim 1, wherein the well comprises one or more of the threaded connections, the method further comprising:
evaluating the overall tubular integrity of the well based on the calculated integrity safety factor ($ISF_{CON}$) associated with one or more of the threaded connections, as installed.

5. A method of evaluating the integrity of a threaded connection, as installed, the method comprising:
calculating an integrity safety factor associated with a threaded connection ($ISF_{CON}$) under a set of current operating conditions, wherein the integrity safety factor is a function of an effective pressure (Pe) and a von Mises stress ($\sigma_{VM}$), according to the equation:

$$ISF_{CON} = \frac{\delta P_e^2 - \alpha P_e + \beta}{\sigma_{VM}}$$

wherein the effective pressure (Pe) and the von Mises stress ($\sigma_{VM}$) are determined based on actual well geometry and the set of current operating conditions, wherein the effective pressure (Pe) is defined by a mean normal stress (P) minus a neutral axial stress ($\sigma_n$), and wherein a leak path factor (δ), a thread modulus (α), and a makeup leak resistance (β) are constants that are calculated based on the threaded connection exposed to one or more test conditions for a well comprising a plurality of threaded connections, building a computer model using a load management computer, wherein the computer model determines a set of current loads associated with the set of current operating conditions;

calculating, using the load management computer, the integrity safety factor associated with each of the plurality of threaded connections ($ISF_{CON}$) based on the computer model;

detecting an anomalous calculated integrity safety factor that is less than a threshold value;

generating, using the load management computer, a plurality of proposed adjustments associated with the set of current operating conditions, wherein each proposed adjustment is tailored to change the set of current loads and thereby improve the anomalous calculated integrity safety factor;

using the computer model to generate a simulation, wherein the simulation forecasts a set of future loads and a plurality of future integrity safety factors ($ISF_{CON}$) based on each proposed adjustment; and executing an optimal adjustment selected from among the plurality of proposed adjustments based on the simulation.

6. The method of claim 5, further comprising:
changing one or more of the set of current operating conditions if the calculated integrity safety factor ($ISF_{CON}$) is less than a threshold value.

7. The method of claim 5, further comprising:
evaluating the overall integrity of a well based on the calculated integrity safety factor ($ISF_{CON}$).

8. The method of claim 5, wherein a well comprises one or more of the threaded connections, the method further comprising:
 evaluating the overall tubular integrity of the well based on the calculated integrity safety factor ($ISF_{CON}$) associated with one or more of the threaded connections, as installed.

9. The method of claim 5, wherein the one or more test conditions comprises a capped-end test condition, the method further comprising:
 calculating the makeup leak resistance ($\beta$) associated with the threaded connection under the capped-end test condition, wherein the capped-end test condition is characterized by an external pressure (Po) equal to zero and an internal pressure at which leak occurs (PiL), according to the equation:

$$\beta = P_{iL}\sqrt{3\left(\frac{A_i A_o}{A_b A_{con}}\right)^2 + 3\left(\frac{A_i + A_{pin}}{A_t}\right)^2}$$

wherein the threaded connection is characterized by a pin, a box, an inner radius (a), a pin-box interface radius (b), and an outer radius (c), and wherein the makeup leak resistance ($\beta$) is a function of a cross-sectional area at the inner radius ($A_i$), a cross-sectional area at the outer radius ($A_o$), a cross-sectional area at the pin-box radius ($A_b$), a connection area ($A_{con}$), an exposed end area of the pin ($A_{pin}$), and an engaged thread area ($A_t$).

10. The method of claim 5, wherein the one or more test conditions comprises a uniaxial tension test condition and a uniaxial compression test condition, the method further comprising:
 calculating the thread modulus ($\alpha$) associated with the threaded connection according to the equation:

$$\alpha = 3(1-m)\left(\frac{\beta}{\sigma_{zT}} - \frac{S}{1+m}\right) = 3(1-m)\left(\frac{\beta}{m\sigma_{zC}} - \frac{S}{1+m}\right)$$

wherein an asymmetry ratio (m) is defined by tension at which leak occurs ($T_L$) under the uniaxial tension test condition relative to a compression at which leak occurs ($C_L$) under the uniaxial compression test condition ($T_L/C_L$), wherein a geometric quantity (S) is defined by the equation, $$S = \sqrt{1 + 3\left(\frac{A_{con}}{A_t}\right)^2}$$

wherein a tensile stress ($\sigma_{zT}$) is defined as the tension at which leak occurs ($T_L$) divided by the connection area ($A_{con}$), and wherein a compressive stress ($\sigma_{zC}$) is defined as the compression at which leak occurs ($C_L$) divided by the connection area ($A_{con}$).

11. The method of claim 10, further comprising:
 calculating the leak path factor ($\delta$) associated with the threaded connection under at least one of the uniaxial tension test condition or the uniaxial compression test condition,
 wherein the uniaxial tension test condition is characterized by an external pressure (Po) equal to zero, an internal pressure (Pi) equal to zero, and the tension at which leak occurs ($T_L$) is equal to a force applied to the threaded connection in tension, and wherein the leak path factor ($\delta$) is calculated according to the equation:

$$\delta = 9\frac{\sigma_{zT}(S + \alpha/3) - \beta}{\sigma_{zT}^2}$$

and wherein the uniaxial compression test condition is characterized by an external pressure (Po) equal to zero, an internal pressure (Pi) equal to zero, and the compression at which leak occurs ($-C_L$) is equal to a compressive force applied to the threaded connection, and wherein the leak path factor ($\delta$) is calculated according to the equation:

$$\delta = 9\frac{\sigma_{zC}(S - \alpha/3) - \beta}{\sigma_{zC}^2}.$$

* * * * *